US012597974B2

(12) United States Patent　　Kalbasi

(10) Patent No.: US 12,597,974 B2
(45) Date of Patent: Apr. 7, 2026

(54) APPARATUS AND METHODS FOR UPLINK BEAMFORMING IN A WIRELESS COMMUNICATION NETWORK

(71) Applicant: Toyota Jidosha Kabushiki Kaisha, Toyota (JP)

(72) Inventor: Reza Kalbasi, San Diego, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 18/549,821

(22) PCT Filed: Mar. 9, 2022

(86) PCT No.: PCT/US2022/019440

§ 371 (c)(1),
(2) Date: Sep. 8, 2023

(87) PCT Pub. No.: WO2022/192327

PCT Pub. Date: Sep. 15, 2022

(65) Prior Publication Data

US 2024/0187062 A1　　Jun. 6, 2024

Related U.S. Application Data

(60) Provisional application No. 63/159,390, filed on Mar. 10, 2021.

(51) Int. Cl.
*H04B 7/06* (2006.01)

(52) U.S. Cl.
CPC ......... *H04B 7/0623* (2013.01); *H04B 7/0617* (2013.01)

(58) Field of Classification Search
CPC ........................... H04B 7/0623; H04B 7/0617
(Continued)

(56) References Cited

U.S. PATENT DOCUMENTS

2002/0009156 A1　1/2002　Hottinen et al.
2002/0105961 A1　8/2002　Hottinen et al.
(Continued)

FOREIGN PATENT DOCUMENTS

EP　　2 442 454 A2　　4/2012
EP　　3 641 155 A1　　4/2020
(Continued)

OTHER PUBLICATIONS

3GPP TS 38.211 V16.3.0 (Sep. 2020), pp. 1-133, 3rd Generation Partnership Project.

*Primary Examiner* — Fitwi Y Hailegiorgis
(74) *Attorney, Agent, or Firm* — Finnegan, Henderson, Farabow, Garrett and Dunner, LLP

(57) ABSTRACT

A method of data transmission includes receiving, by a user equipment (UE) from a base station (BS), a configuration message including one or more signal quality indicators associated with configuration parameters of a first uplink beam and determining, by the UE, configuration parameters associated with a second uplink beam. The determining is based on: the one or more signal quality indicators associated with configuration parameters of the first uplink beam and the configuration parameters of the first uplink beam. The method further includes configuring, by the UE, the second uplink beam based on the determined configuration parameters for the second uplink beam and transmitting, by the UE to the BS, uplink data or control information using the second uplink beam.

15 Claims, 21 Drawing Sheets

(58) Field of Classification Search
USPC ........................................................ 375/262
See application file for complete search history.

(56)                    References Cited

U.S. PATENT DOCUMENTS

| | | |
|---|---|---|
| 2010/0266063 A1 | 10/2010 | Harel et al. |
| 2014/0057633 A1 | 2/2014 | Gresset et al. |
| 2014/0185481 A1 | 7/2014 | Seol et al. |
| 2018/0103433 A1 | 4/2018 | Li et al. |
| 2018/0262993 A1* | 9/2018 | Akkarakaran ...... H04W 52/325 |
| 2019/0132033 A1 | 5/2019 | Akkarakaran et al. |
| 2020/0091978 A1 | 3/2020 | Noh et al. |
| 2020/0322893 A1 | 10/2020 | Yao et al. |
| 2021/0127413 A1 | 4/2021 | Lu et al. |
| 2022/0360411 A1 | 11/2022 | Hirata et al. |
| 2024/0098749 A1 | 3/2024 | Lu et al. |

FOREIGN PATENT DOCUMENTS

| | | |
|---|---|---|
| JP | 2003-500977 A | 1/2003 |
| JP | 2014-509802 A | 4/2014 |
| JP | 2016-506681 A | 3/2016 |
| JP | 2018-061246 A | 4/2018 |
| JP | 2020-529808 A | 10/2020 |
| JP | 2021-501518 A | 1/2021 |
| JP | 2022-531228 A | 7/2022 |
| KR | 10-2021-0025670 A | 3/2021 |
| WO | WO 2017/086843 A1 | 5/2017 |
| WO | WO 2020/167747 A1 | 8/2020 |
| WO | WO 2020/223195 A1 | 11/2020 |
| WO | WO 2021/010132 A1 | 1/2021 |

* cited by examiner

500

| Physical Signal | DM-RS | PT-RS | PRS | CSI-RS | PSS | SSS | SRS |
|---|---|---|---|---|---|---|---|
| DL | X | X | X | X | X | X | |
| UL | X | X | | | | | X |

Determine Bemaforming gain G — 2002

Determine RF power consumption for beamforming and single antenna transmission — 2006

Compute total power for beamforming scheme P1 — 2012

Compute total power for single antenna transmission P2 — 2016

2010  P1<P2

No  2020  transmit data using single antenna scheme

Yes  2024  transmit data using beamforming scheme

2000

APPARATUS AND METHODS FOR UPLINK BEAMFORMING IN A WIRELESS COMMUNICATION NETWORK

CROSS-REFERENCE TO RELATED APPLICATIONS

This application is a § 371 national phase of PCT/US2022/019440, filed Mar. 9, 2022, which claims priority under 35 USC § 119(e) from U.S. Provisional Patent Application No. 63/159,390, filed on Mar. 10, 2021 all of which are incorporated herein by reference.

BACKGROUND OF THE INVENTION

The present invention is directed to 5G, which is the 5th generation mobile network. It is a new global wireless standard after 1G, 2G, 3G, and 4G networks. 5G enables networks designed to connect machines, objects and devices. The invention also relates to uplink beamforming in a 5G network

SUMMARY OF THE INVENTION

In an embodiment, the invention provides a method of data transmission that includes receiving, by a user equipment (UE) from a base station (BS), a configuration message including one or more signal quality indicators associated with configuration parameters of a first uplink beam and determining, by the UE, configuration parameters associated with a second uplink beam based on: the one or more signal quality indicators associated with configuration parameters of the first uplink beam; and the configuration parameters of the first uplink beam; configuring, by the UE, the second uplink beam based on the determined configuration parameters for the second uplink beam; and transmitting, by the UE to the BS, uplink data or control information using the second uplink beam.

The configuration parameters may include one or more of: a transmit power control (TPC) signal; and a phase feedback (PF) signal. The step of determining includes mapping the configuration parameters to integer values based on one or more look up tables. The step of determining identifies the configuration parameters that maximize the second uplink beam signal-to-noise ratio (SNR) at the BS. The method may also include performing an adaptive tracking scheme to track the configuration parameters of the second uplink beam. The adaptive tracking scheme is based on a gradient descent algorithm. The configuration message further includes: an identifier to identify configuration message; at least one transmit power control (TPC) field; and at most N phase feedback (PF) fields, wherein N is a number of user equipments (UEs) in a group in a cell specified by the base station (BS). The configuration message is received via a downlink control information (DCI).

In an embodiment, the invention includes a method of determining a data transmission scheme that includes first transmitting, by a user equipment (UE) to a base station (BS) data or control information using a first transmission scheme in a first time period, first computing, by the UE, a first transmit power for transmission of the data or control information to the BS for the first transmission scheme, second transmitting, by a user equipment UE to a base station (BS) data or control information using a second transmission scheme in a second time period, second computing, by the UE, a second transmit power for the transmission of the data or control information to the BS for the second transmission scheme and determining, by the UE, transmission of the data or control information by the first or second transmission scheme, based on the computed first power and the computed second power.

In an embodiment, the invention includes a method of data transmission that includes determining by the base station (BS), configuration parameters of an uplink beam and transmitting, by the BS, to a user equipment (UE), a configuration message including one or more signal quality indicators associated with the configuration parameters of the uplink beam. The configuration parameters may include one or more of: a signal-to-noise ratio (SNR); and a phase information of the uplink beam. The method may further include first computing the signal quality indicators based on the configuration parameters. The signal quality indicators comprise one or more of: a transmit power control (TPC) command; and a phase feedback (PF) command.

Preferably, the configuration message includes: an identifier to identify the configuration message; at least one TPC field; and at most N phase feedback (PF) fields, wherein N is number of user equipments (UEs) in a group in a cell specified by the base station (BS). The configuration message is transmitted via a downlink control information (DCI).

In an embodiment, the invention provides a user equipment (UE) that includes a transceiver configured to: receive a configuration message including one or more signal quality indicators associated with configuration parameters of a first uplink beam and transmit uplink data or control information using a second uplink beam; and a processor in communication with transceiver, the processor configured to determine the configuration parameters associated with the second uplink beam based on: the one or more signal quality indicators associated with the configuration parameters of the first uplink beam and the configuration parameters of the first uplink beam; and configure the second uplink beam based on the determined configuration parameters for the second uplink beam.

In an embodiment, the invention provides a base station including a processor configured to determine configuration parameters of an uplink beam and a transceiver in communication with the processor and configured to transmit a configuration message indicating one or more signal quality indicators associated with the configuration parameters of an uplink beam.

In an embodiment the invention provides a non-transitory computer-readable medium having program code recorded, which upon processing by a computer processor, implements acts including a UE receiving a configuration message including one or more signal quality indicators associated with configuration parameters of a first uplink beam; the UE determining configuration parameters associated with a second uplink beam based on: the one or more signal quality indicators associated with configuration parameters of the first uplink beam and the configuration parameters of the first uplink beam; the UE configuring the second uplink beam based on the determined configuration parameters for the second uplink beam and the UE transmitting uplink data or control information using the second uplink beam.

In an embodiment, the invention includes a non-transitory computer-readable medium having program code recorded, which upon processing by a computer processor implements acts including a base station (BS) configuring parameters of an uplink beam and the BS transmitting a configuration message indicating one or more signal quality indicators associated with the configuration parameters of the uplink beam.

In an embodiment, the invention provides a user equipment (UE) including means for receiving, from a base station (BS), a configuration message indicating one or more signal quality indicators associated with configuration parameters of a first uplink beam; and means for determining configuration parameters associated with a second uplink beam based on: the one or more signal quality indicators associated with configuration parameters of the first uplink beam and the configuration parameters of the first uplink beam; means for configuring, the second uplink beam based on the determined configuration parameters for the second uplink beam; and means for transmitting, to the BS, uplink data or control information using the second uplink beam.

BRIEF DESCRIPTION OF THE DRAWINGS

FIG. 5 shows example physical signals in downlink and uplink according to some aspects of some of various exemplary embodiments of the present disclosure.

DETAILED DESCRIPTION OF THE INVENTION

Figure 1:
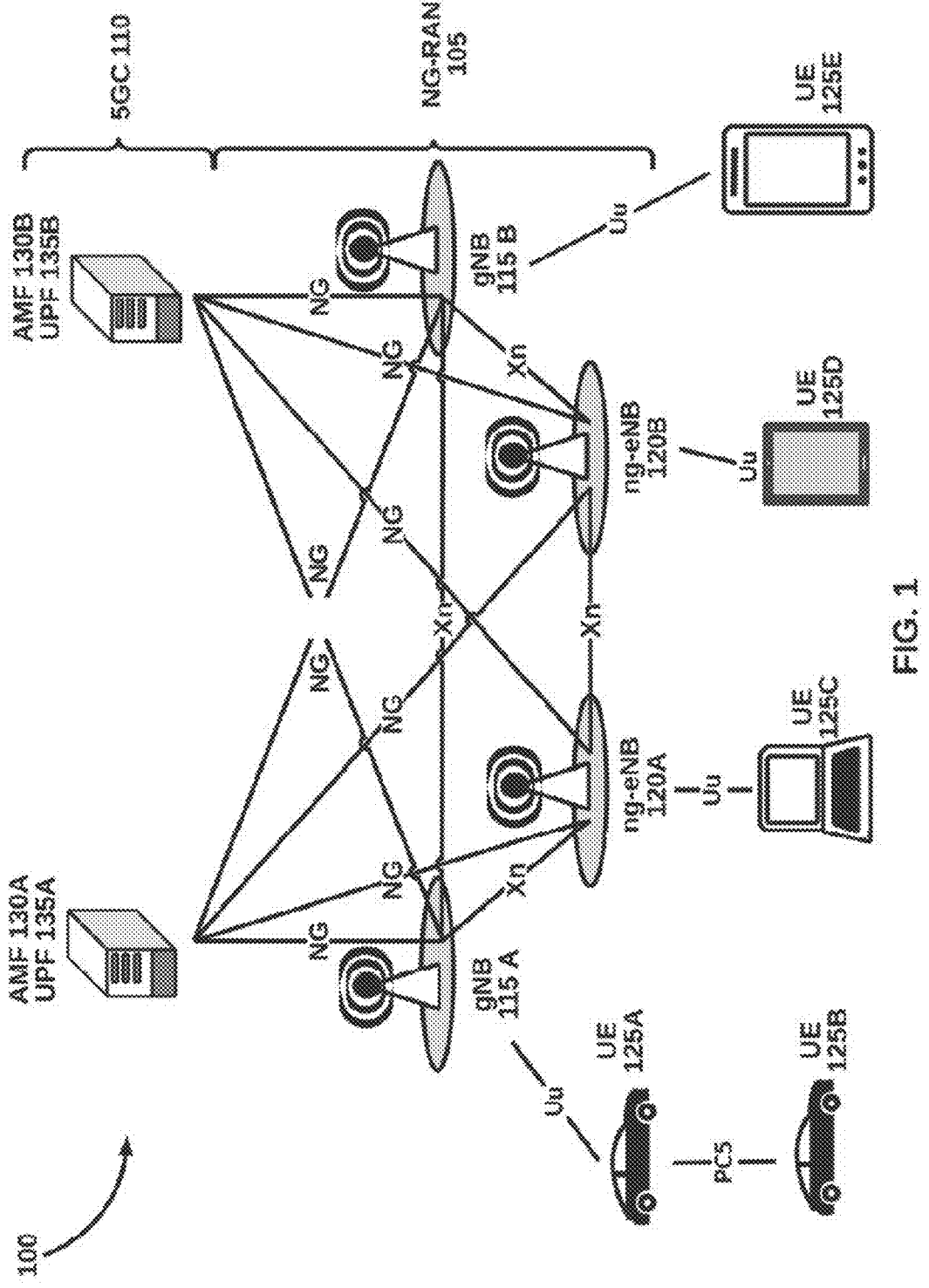
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc.

Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport IP layer, point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that originates sidelink communication frames. The Destination Layer-2 ID may be a link-layer identity that identifies a device that are recipients of sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
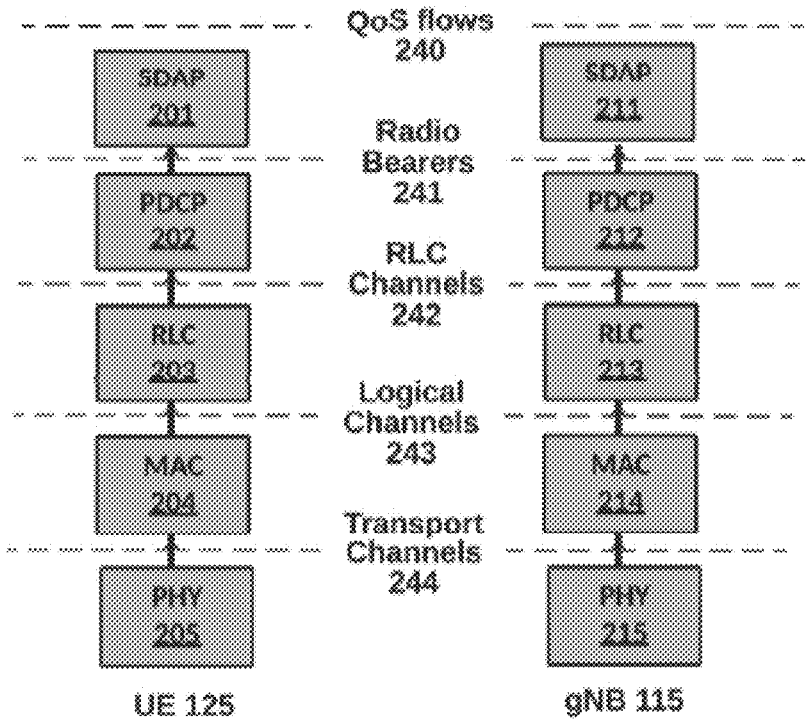
FIG. 2A and FIG. 2B show examples of radio protocol stacks for user plane and control plane, respectively, according to some aspects of some of various exemplary embodiments of the present disclosure.
Figure 2B:
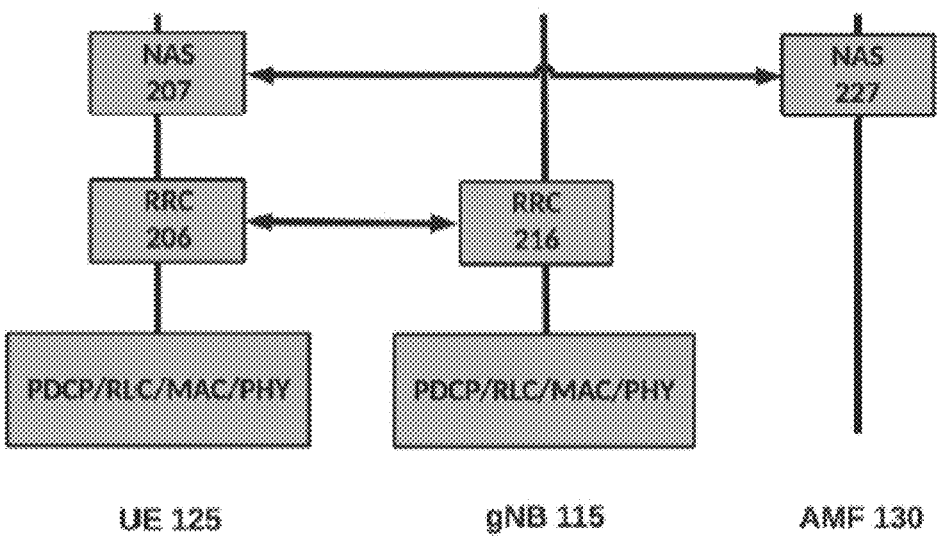

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or more different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling;

Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR);

Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

Figure 3A:
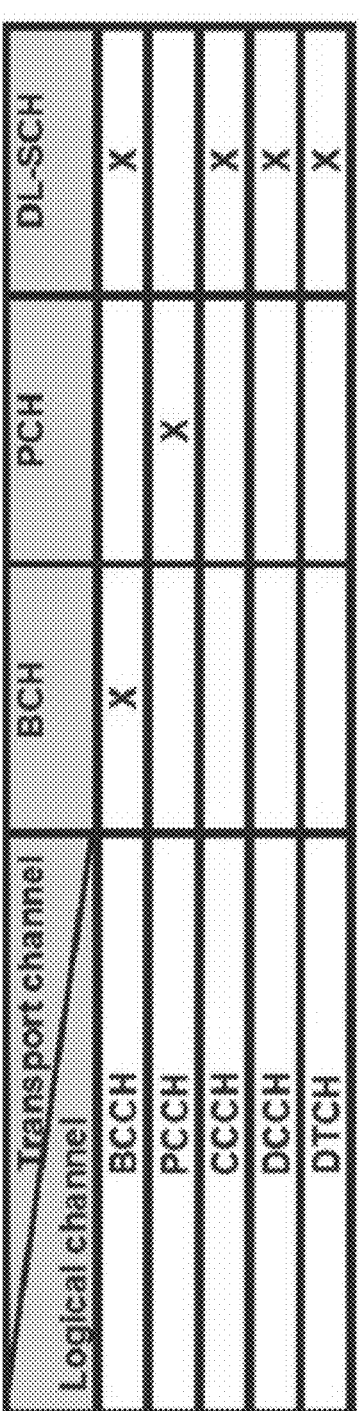
FIG. 3A and FIG. 3B show example mappings between logical channels and transport channels in downlink and uplink respectively, according to some aspects of some of various exemplary embodiments of the present disclosure.
Figure 3B:
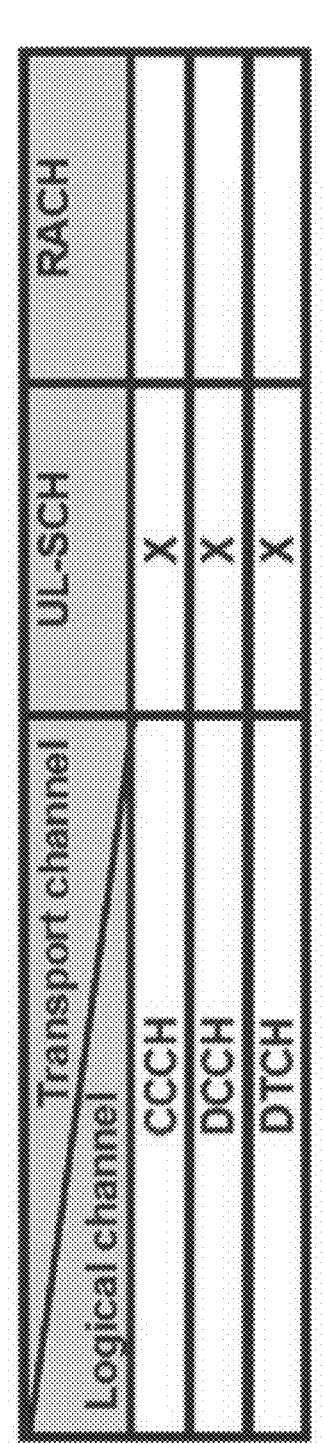

FIG. 3A, FIG. 3B show example mappings between logical channels and transport channels in downlink and uplink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink.

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

Figures 4A, 4B:
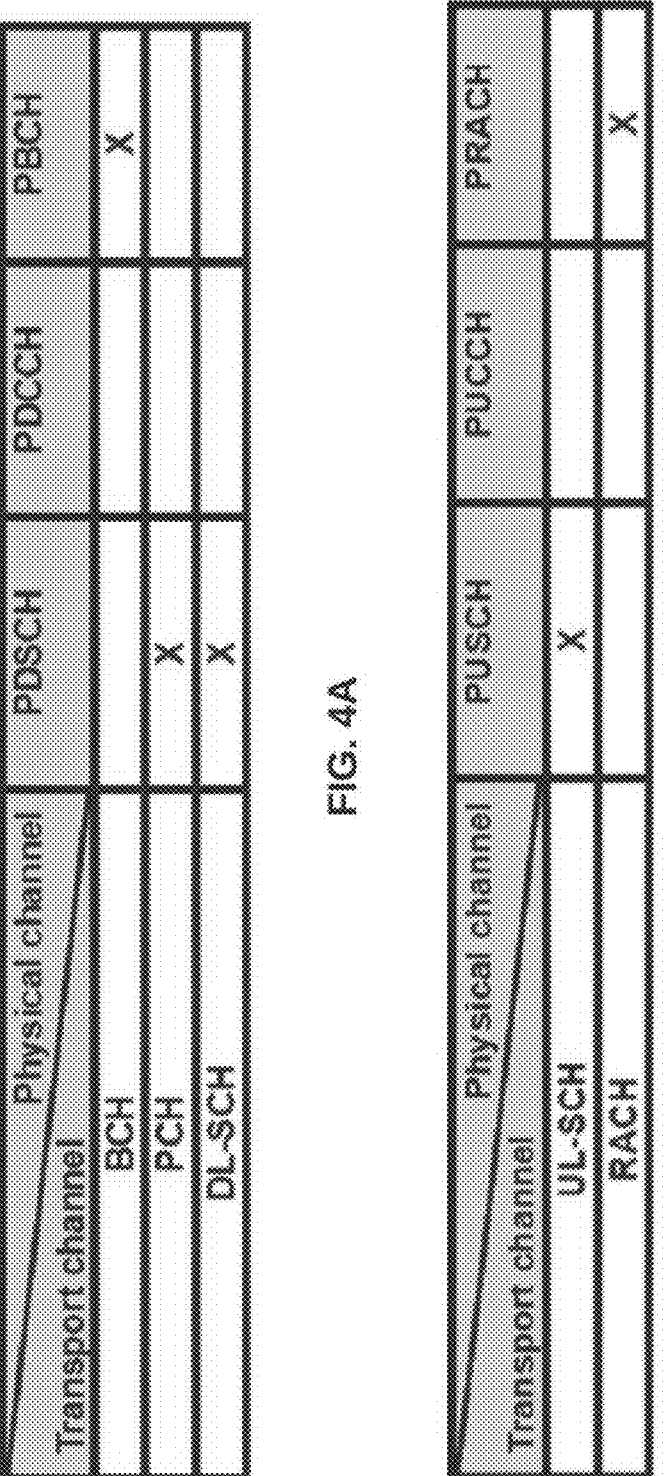
FIG. 4A and FIG. 4B show example mappings between transport channels and physical channels in downlink and uplink respectively, according to some aspects of some of various exemplary embodiments of the present disclosure.

FIG. 4A, FIG. 4B show example mappings between transport channels and physical channels in downlink, and uplink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

FIG. 5 shows example physical signals in downlink, and uplink according to some aspects of some of various exemplary embodiments of the present disclosure. The Demodulation Reference Signal (DM-RS) may be used in downlink and uplink, and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink and uplink, and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink. CSI-RS may be used for channel state estimation, Reference Signal Received Power (RSRP) measurement for mobility and beam management, time/frequency tracking for demodulation among other uses. CSI-RS may be configured for a UE-specifically but multiple users may share the same CSI-RS resource. The UE may determine CSI reports and transit them in the uplink to the base station using PUCCH or PUSCH. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS.

Figure 6:
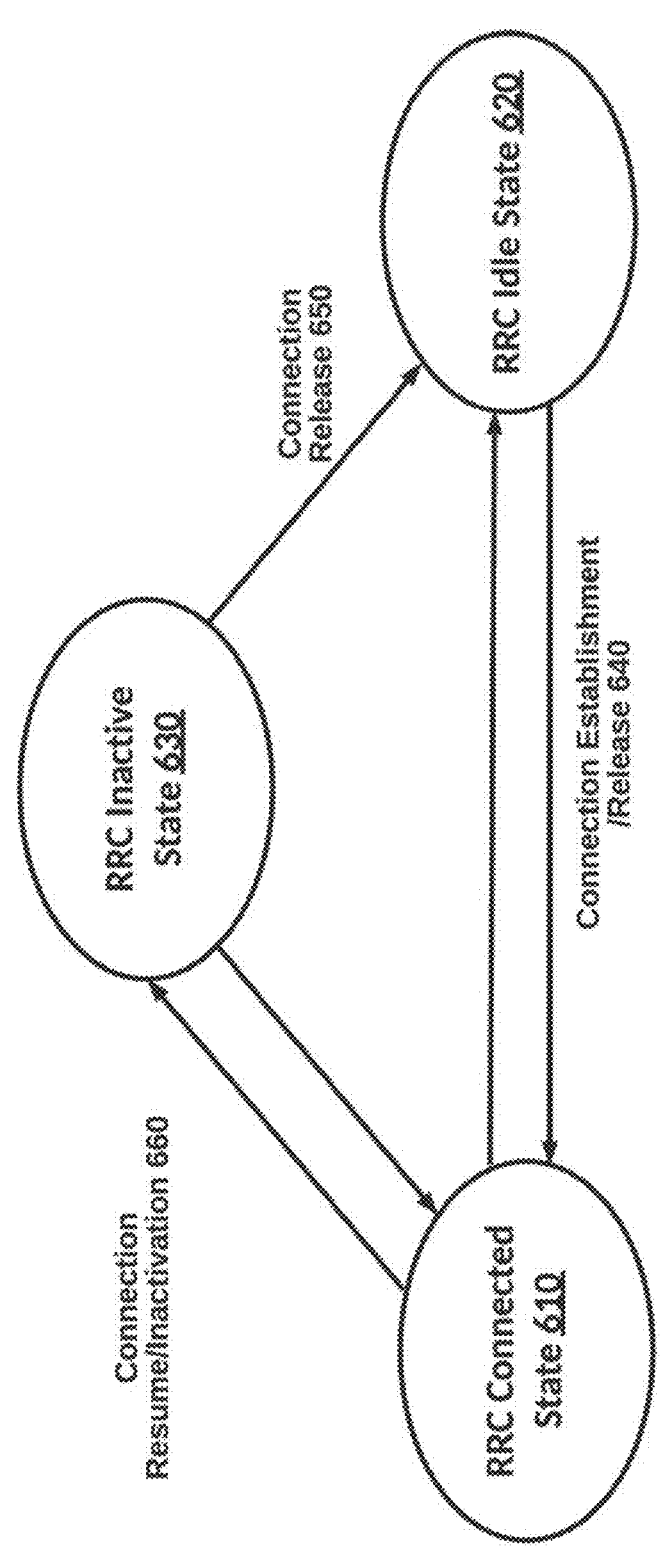
FIG. 6 shows examples of Radio Resource Control (RRC) states and transitioning between different RRC states according to some aspects of some of various exemplary embodiments of the present disclosure.

FIG. 6 shows examples of Radio Resource Control (RRC) states and transitioning between different RRC states according to some aspects of some of various exemplary embodiments of the present disclosure. A UE may be in one of three RRC states: RRC Connected State 610, RRC Idle State 620 and RRC Inactive state 630. After power up, the UE may be in RRC Idle state 620 and the UE may establish connection with the network using initial access and via an RRC connection establishment procedure to perform data transfer and/or to make/receive voice calls. Once RRC connection is established, the UE may be in RRC Connected State 610. The UE may transition from the RRC Idle state 620 to the RRC connected state 610 or from the RRC Connected State 610 to the RRC Idle state 620 using the RRC connection Establishment/Release procedures 640.

To reduce the signaling load and the latency resulting from frequent transitioning from the RRC Connected State 610 to the RRC Idle State 620 when the UE transmits frequent small data, the RRC Inactive State 630 may be used. In the RRC Inactive State 630, the AS context may be stored by both UE and gNB. This may result in faster state transition from the RRC Inactive State 630 to RRC Connected State 610. The UE may transition from the RRC Inactive State 630 to the RRC Connected State 610 or from the RRC Connected State 610 to the RRC Inactive State 630 using the RRC Connection Resume/Inactivation procedures 660. The UE may transition from the RRC Inactive State 630 to RRC Idle State 620 using an RRC Connection Release procedure 650.

Figure 7:
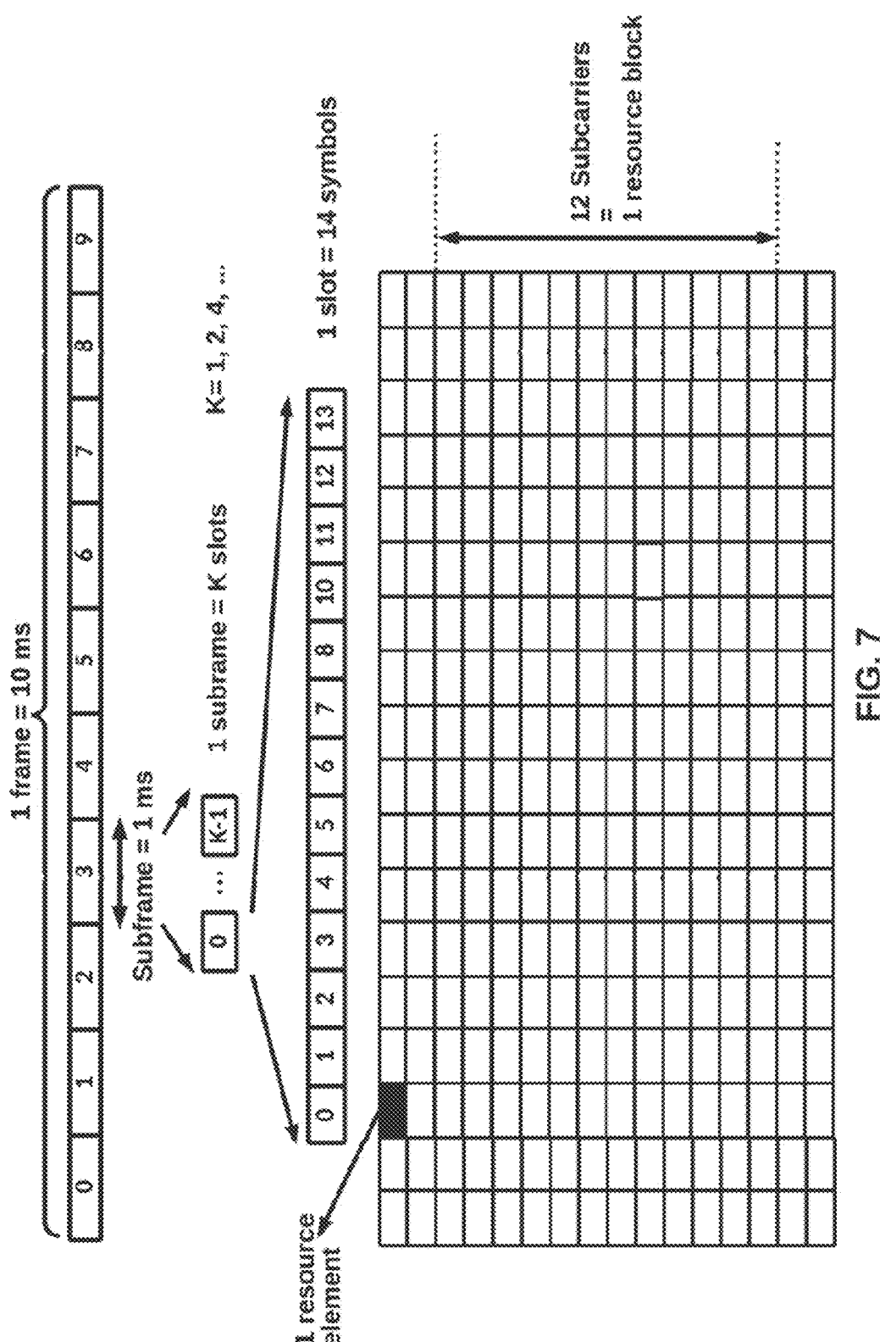
FIG. 7 shows example of frame structure and physical resources according to some aspects of some of various exemplary embodiments of the present disclosure.

FIG. 7 shows example frame structure and physical resources according to some aspects of some of various exemplary embodiments of the present disclosure. The downlink or uplink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 7 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 8:
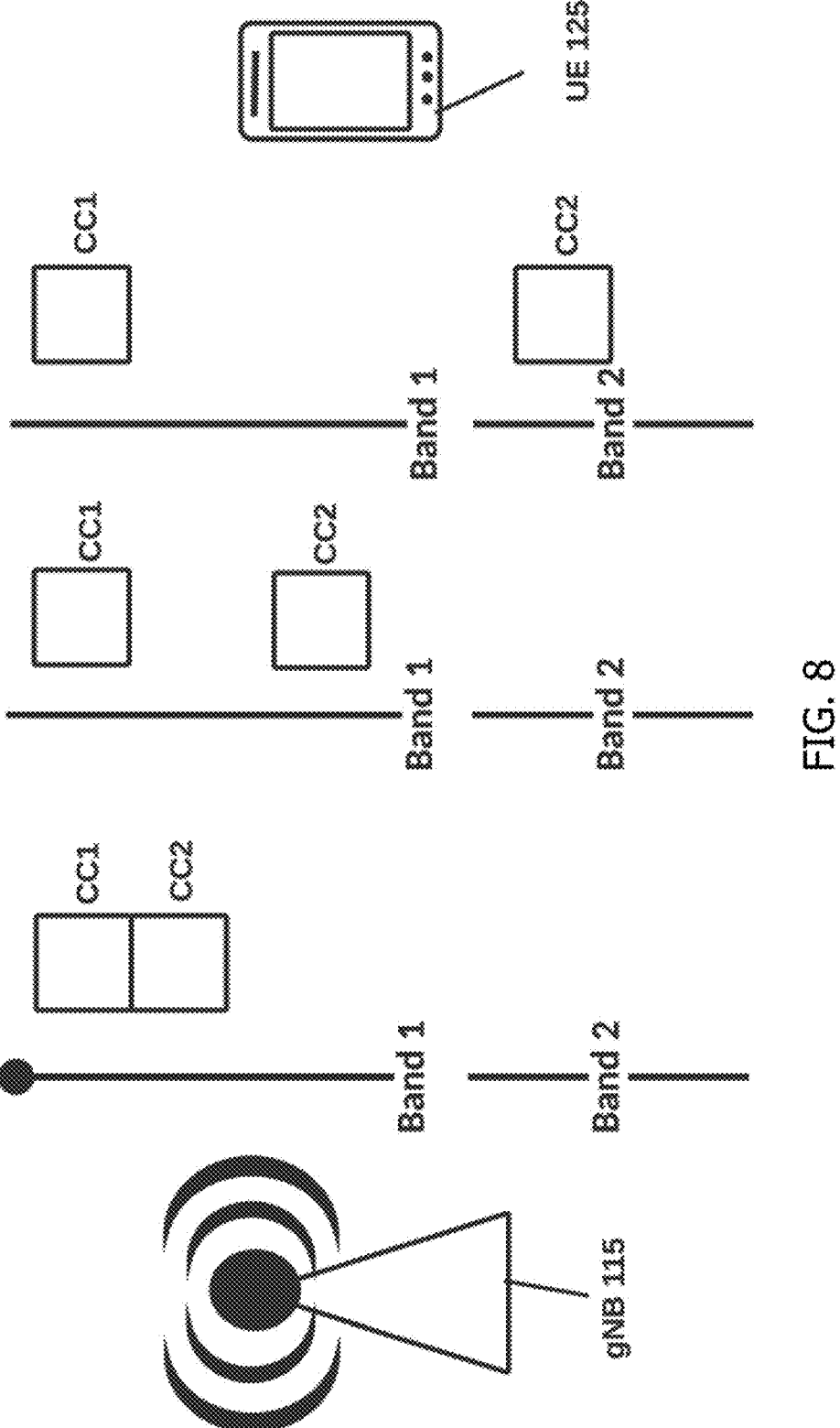
FIG. 8 shows example of component carrier configurations in different carrier aggregation scenarios according to some aspects of some of various exemplary embodiments of the present disclosure.

FIG. 8 shows example component carrier configurations in different carrier aggregation scenarios according to some aspects of some of various exemplary embodiments of the present disclosure. In Carrier Aggregation (CA), two or more Component Carriers (CCs) may be aggregated. A UE 125 may simultaneously receive or transmit on one or multiple CCs depending on its capabilities. CA may be supported for both contiguous and non-contiguous CCs in the same band or on different bands as shown in FIG. 8. A gNB 115 and the UE 125 may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE 125 may adjust the timing of its uplink transmissions using an uplink timing control procedure. A Timing Advance (TA) may be used to adjust the uplink frame timing relative to the downlink frame timing. The gNB 115 may determine the desired Timing Advance setting and provides that to the UE. The UE 125 may use the provided TA to determine its uplink transmit timing relative to the UE's observed downlink receive timing.

In the RRC Connected state, the gNB 115 may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE 125 may use any of the activated SCells of this TAG as a timing reference cell and may not change it unless necessary.

Timing advance updates may be signaled by the gNB 115 to the UE 125 via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE 125 with single timing advance capability for CA may simultaneously receive and/or transmit on multiple CCs corresponding to multiple serving cells sharing the same timing advance (multiple serving cells grouped in one TAG). A UE 125 with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE 125 may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE 125 may have one RRC connection with the network. At RRC connection establishment/re-establishment/ handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE 125 may be configured with a plurality of cells comprising a Master Cell Group (MCG) for communications with a master base station, a Secondary Cell Group (SCG) for communications with a secondary base station, and two MAC entities: one MAC entity for the MCG for communications with the master base station and one MAC entity for the SCG for communications with the secondary base station.

Figure 9:
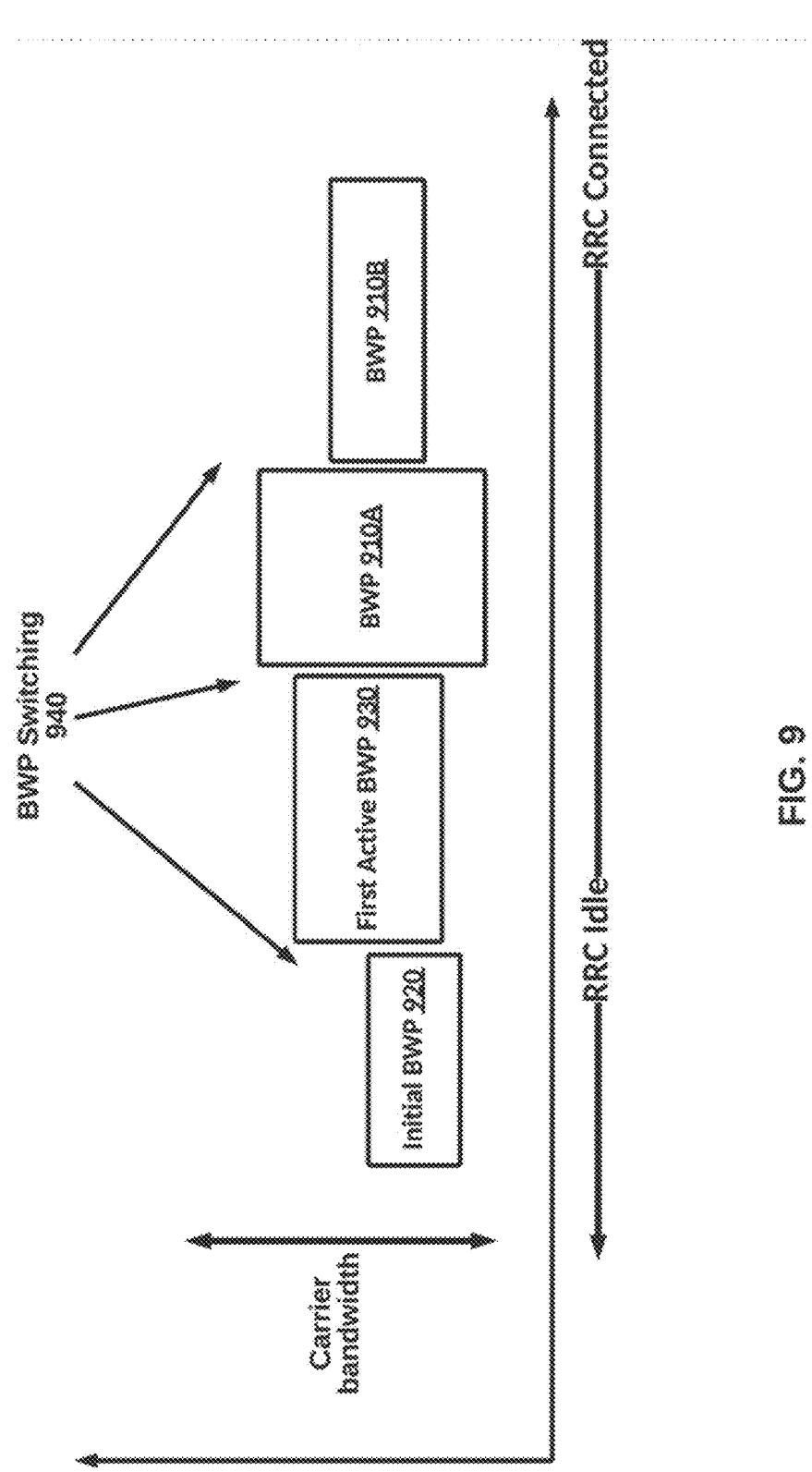
FIG. 9 shows example of bandwidth part configuration and switching according to some aspects of some of various exemplary embodiments of the present disclosure.

FIG. 9 shows example bandwidth part configuration and switching according to some aspects of some of various exemplary embodiments of the present disclosure. The UE (e.g., 125) may be configured with one or more Bandwidth Parts (BWPs) 910 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 920 determined from system information may be used. With Bandwidth Adaptation (BA), for example through BWP switching 940, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 930 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 10:
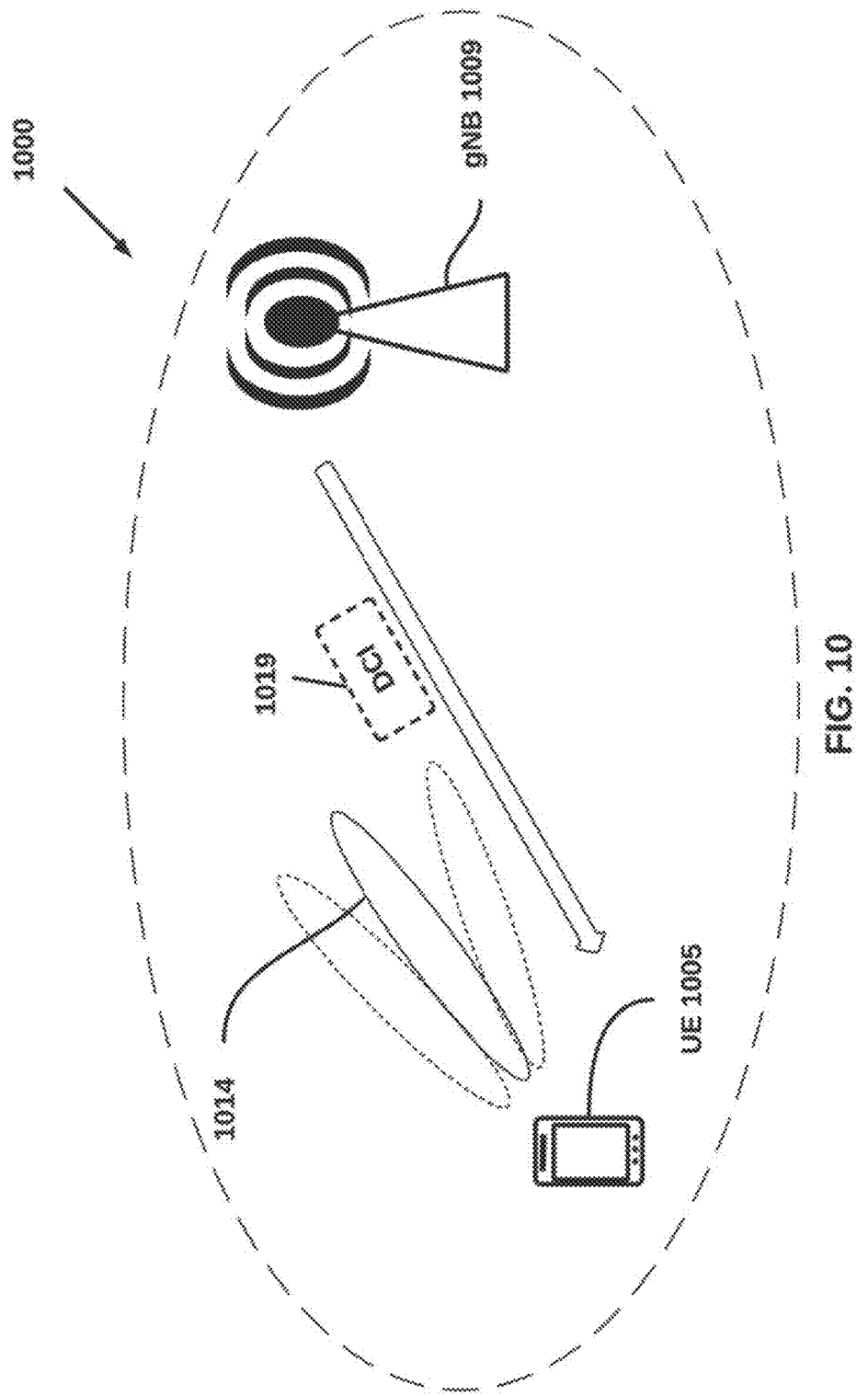
FIG. 10 shows example of uplink beamforming scheme according to some aspects of some of various exemplary embodiments of the present disclosure.

FIG. 10 shows example of UL beamforming configuration 1000 according to some aspects of some of various exemplary embodiments of the present disclosure. The UE 1005 may use beamforming scheme for UL transmission of data and control information. The beamformed data may be transmitted on PUSCH, and the beamformed control information may be transmitted on PUCCH. As shown, the UE 1005 may use beamforming scheme to steer the antenna beam 1014 toward the gNB 1009, rather than having the signal spread in all directions from its antenna. The UE 1005 may use antenna array to steer the steer the radiation patterns 1014 toward the gNB 1009. By steering the beam 1014 in a specific direction, beamforming scheme of the configuration 1000, allows the UE 1005 to deliver higher signal quality to the gNB 1009, increased data rate, and lower reduced latency, without needing to increase the transmission power of UE 1005. Additionally, the beamforming scheme, can reduce the interference experienced by the other users in the same or adjacent cell.

In some embodiments, the gNB 1009, may transmit control information via Downlink Control Information (DCI) message 1019. The gNB 1009, may transmit the DCI 1019 via PDSCH. The DCI may include scheduling assignment for PUSCH and PUCCH. For instance, the DCI 1019 may include frequency and time domain resource assignments, HARQ feedback, Transmit Power Control (TPC) commands, modulation and coding scheme, antenna port, etc. In some embodiments the UE 1005 may use the information signals in DCI message 1019 to estimate and update the beamforming weights as described herein in FIG. 11-12. In some other embodiments, the gNB 1009 may transmit beamforming commands via DCI message 1019, and the UE 1005 may use the information signals in DCI message 1019 to estimate and update the beamforming weights as described herein in FIG. 11-12.

Figure 11:
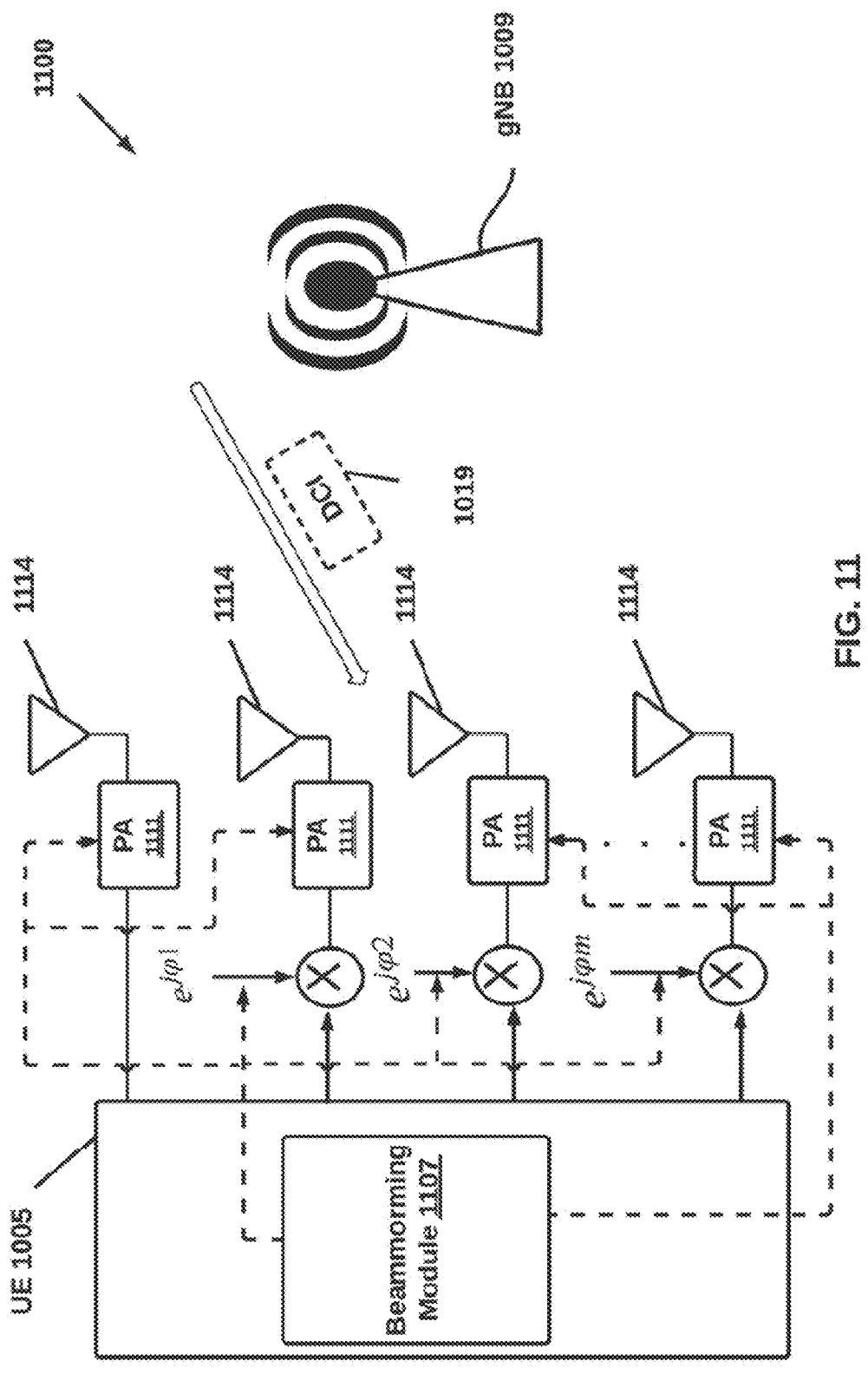
FIG. 11 shows example of a specific uplink beamforming scheme according to some aspects of some of various exemplary embodiments of the present disclosure.

FIG. 11 shows an embodiment of UL beamforming configuration 1100 according to some aspects of some of various exemplary embodiments of the present disclosure. The UE 1005 includes an antenna array consisting of m+1 transmit antennas 1114. In the configuration 1100, the UE 1005, applies a beamforming scheme to transmit signals at the antenna before transmission to gNB. In the beamforming scheme 1100, the transmit signals are multiplied by a beamforming vector $$W^T = [w_1, w_2, w_3, w_4] = \frac{1}{\sqrt{2}}[1, e^{j\varphi 1}, e^{j\varphi 2}, \dots, e^{j\varphi m}]$$

The beamforming module 1107 computes the beamforming vector W based the received information from the DCI message 1019. The beamforming vector W is computed such that the received signals from the antennas 1114 are coherently added the received antennas at the gNB 1009. In some embodiments, the beamforming module 1107 may estimate the beamforming vector W at the beginning of each time frame, and use it for entire time frame length. In some other embodiments, the beamforming module 1107 may update the beamforming vector W according to wireless propagation channel variations dynamically during the time frame length. The Power Amplifier (PA) 1111 converts low power radio frequency signals (RF) into a higher power signal to drive the antennas 1114.

The DCI message 1019, may include TPC commands to inform the UE 1005 to increase or decrease its transmission power to achieve a target SNR at the gNB 1009. In some embodiments, the UE 1005 may use TPC commands to compute the beamforming vector W, and select the transmit power. The beamforming vector computation and transmit power selection may be performed jointly or independently. In some implementations, the phase φi, i=1, . . . , m may be computed by a sign descent gradient algorithm $$\varphi i(n{+}1){=}\varphi i(n){+}tpc(n)\Delta\varphi \mathrm{sgn}(\varphi i(n){-}\pi{<}\varphi i(n){\leq}\pi \qquad (1)$$

where φi(n), i=1, . . . , m denotes the beamforming phase oi at time n, tpc (n) corresponds to the TPC command at time n, Δφ is phase update step, and sgn (x) is sign of x. Table 1 shows an example of mapping between TPC command and tpc(n).

In some implementations, the transmission power can be updated as $$P(n+1) = \min\begin{cases} Pmax \\ P(n) - \Delta P * tpc(n) \;\; \mathrm{dB} \end{cases} \qquad (2)$$

where the Pmax is the maximum power the UE 1005 can transmit.

TABLE 1

| TPC Command Field Δ | tpc(n) |
|---|---|
| 0 | −2 |
| 1 | −1 |
| 2 | 1 |
| 3 | 2 |

In some embodiments, the DCI message 1019, may include both beamforming commands and TPC commands independently. The beamforming commands provides a feedback on UL beamforming vector adaptation and computation. The UE 1005 may use the beamforming commands to compute the beamforming vector W, and selects the transmit power. The beamforming vector computation and transmit power selection may be performed independently. In some implementations, the phase φi, i=1, . . . , m may be computed by a descent gradient algorithm $$\varphi i(n{+}1){=}\varphi i(n){+}\mu F(n){-}\pi{<}\varphi i(n){\leq}\pi \qquad (3)$$

where F(n) is the phase feedback at time n, and μ is a constant. The computed phase φi(n) is mapped to the interval [−π, π]. For instance, a two-bit phase feedback is shown in Table 2.

TABLE 2

| Phase Feedback | F(n) |
|---|---|
| 0 | −2 |
| 1 | −1 |
| 2 | 1 |
| 3 | 2 |

Figure 12:
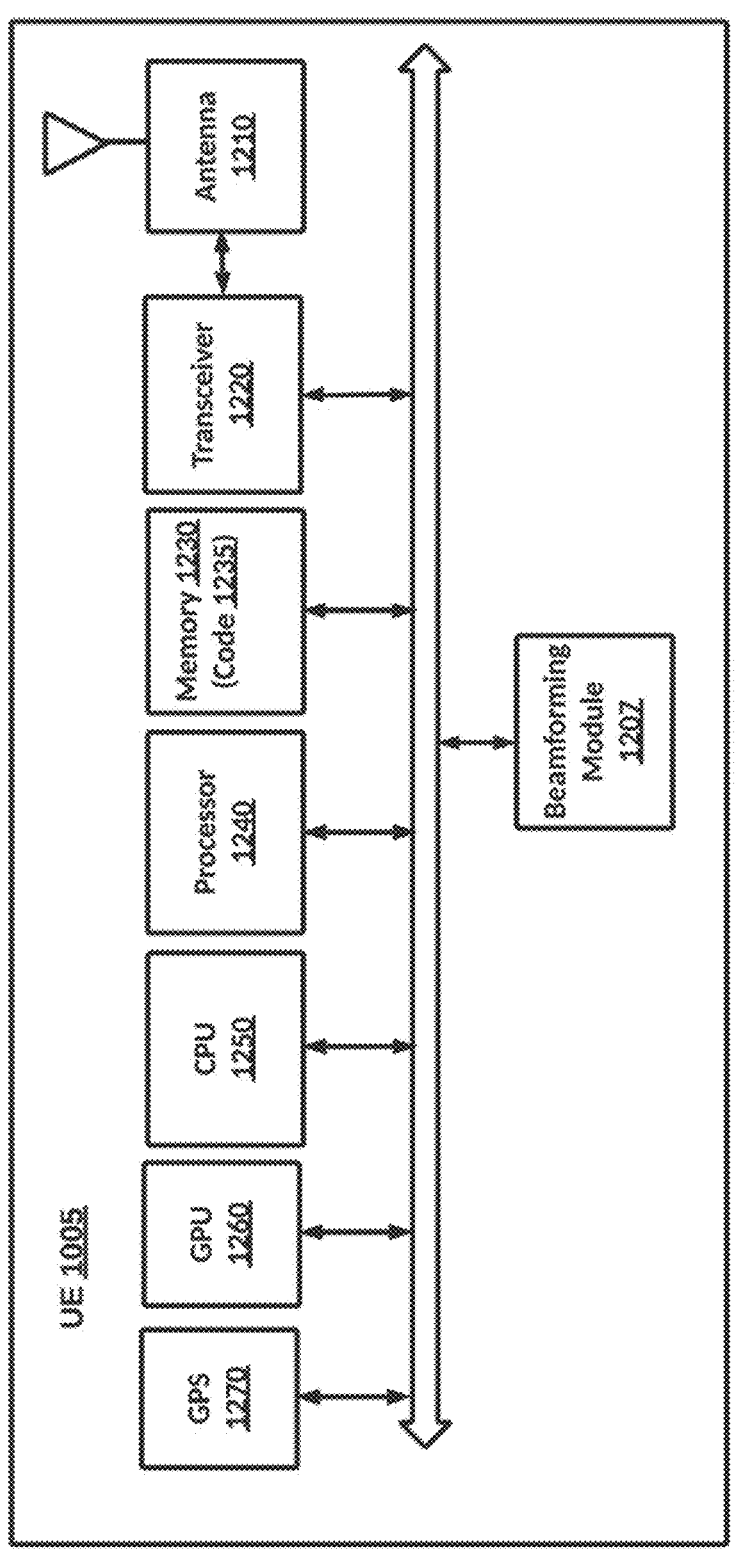
FIG. 12 shows example components of a user equipment for transmission and/or reception according to some aspects of some of various exemplary embodiments of the present disclosure.

FIG. 12 shows example components of a user equipment 1005 for transmission and/or reception according to some aspects of some of various exemplary embodiments of the present disclosure. All or a subset of blocks and functions in FIG. 12 may be in the user equipment 1005 and may be performed by the user equipment 1005. The antenna 1210 may be used for transmission or reception of electromagnetic signals. The Antenna 1210 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1210 may enable a massive MIMO configuration with tens or hundreds of antenna elements. The antenna 1210 may enable other multi-antenna techniques such as beamforming. In some examples and depending on the UE 1005 capabilities or the type of UE 1005 (e.g., a low-complexity UE), the UE 1005 may support a single antenna only.

The transceiver 1220 may communicate bi-directionally, via the antenna 1210, wireless links as described herein. For example, the transceiver 1220 may represent a wireless transceiver at the UE and may communicate bi-directionally with the wireless transceiver at the base station or vice versa. The transceiver 1220 may include a modem to modulate the packets and provide the modulated packets to the antennas 1210 for transmission, and to demodulate packets received from the Antennas 1210.

The memory 1230 may include RAM and ROM. The memory 1230 may store computer-readable, computer-executable code 1235 including instructions that, when executed, cause the processor to perform various functions described herein. In some examples, the memory 1230 may contain, among other things, a Basic Input/output System (BIOS) which may control basic hardware or software operation such as the interaction with peripheral components or devices.

The processor 1240 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory using a memory controller. In other examples, a memory controller may be integrated into the processor 1240. The processor 1240 may be configured to execute computer-readable instructions stored in a memory (e.g., the memory 1230) to cause the UE 1005 to perform various functions.

The Central Processing Unit (CPU) 1250 may perform basic arithmetic, logic, controlling, and Input/output (I/O) operations specified by the computer instructions in the Memory 1230. The user equipment 1005 may include additional peripheral components such as a graphics processing unit (GPU) 1260 and a Global Positioning System (GPS) 1270. The GPU 1260 is a specialized circuitry for rapid manipulation and altering of the Memory 1230 for accelerating the processing performance of the user equipment 1005. The GPS 1270 may be used for enabling location-based services or other services for example based on geographical position of the user equipment 1005.

The beamforming module 1207 may be implemented via hardware, software, or combination thereof. For instance, the beamforming module 1207 may be implemented as instruction codes 1235, stored in the memory 1230, and executed by the processor 1240, or as a circuit. The beamforming module 1207 may be used to perform various aspects and functionality related to present disclosure. For instance, the beamforming module 1207 is configured to perform manage beamforming functions including beamforming vector computation and adaptation, transmit power control, processing beamforming and power control feedback from gNB, and reporting beamforming information to the gNB. In some examples, the beamforming module 1207 may perform a set of physical layer/medium access control procedures to acquire and maintain a set of beam pair links e.g., a beam used at transmit-receive point(s) (TRP(s)) for BS side paired with a beam used at UE. The beam pair links may be used for downlink and uplink transmission/reception. The beam management procedures may include one or more of: beamforming vector computation and adaptation, receiving beamforming and power control command, a beam sweeping process, a beam measurement process, a beam reporting process, a beam determination process, a beam maintenance process, and a beam recovery process. For example, beamforming vector may be computed at the beginning of a time frame for a low varying wireless channel, while it may be tracked during a time frame for a fast varying wireless channel. Power control and beamforming commands may be received via PDCCH, and the UE may decode the PDCCH to perform the commands. The Beam sweeping process may be used for covering a spatial area, with beams transmitted and/or received during a time interval in a predetermined way. The beam measurement process may be used by the TRP(s) or UE to measure characteristics of received beamformed (BF) signals. The beam reporting process may be used by the UE to report information of BF signal(s) based on beam measurement.

The beam determination process may be used by the TRP(s) or UE to select the Tx/Rx beam(s). The beam maintenance process may be used by the TRP(s) or UE to maintain the candidate beams by beam tracking or refinement to adapt to the channel changes due to UE movement or blockage. The beam recovery process may be used by the UE to identify new candidate beam(s) after detecting beam failure and subsequently indicate the TRP of beam recovery request with information of indicating the new candidate beam(s).

In some examples, beam management may be performed in UL and/or DL directions. When good channel reciprocity is available (e.g. in time division duplex (TDD) systems), beam management of one direction may be based on another direction, e.g. UL beam management may perform well based on the results of DL beam management. In some examples, beam correspondence may be used based on uplink-downlink reciprocity of beamformed channel, for example UL Tx/Rx beam(s) may be determined based on beam measurement of DL beamformed reference signals (RSs).

In some examples, group-based beam management may be used to manage beams in group basis instead of beam-by-beam basis, for example, considering that beams sharing similar channel properties may be put into the same beam group. The beam management procedure may include beam sweeping, beam measurement, beam reporting (e.g., group-ing based beam reporting), beam determination, beam maintenance (e.g., group-based beam maintenance) and beam failure recovery.

Figure 13:
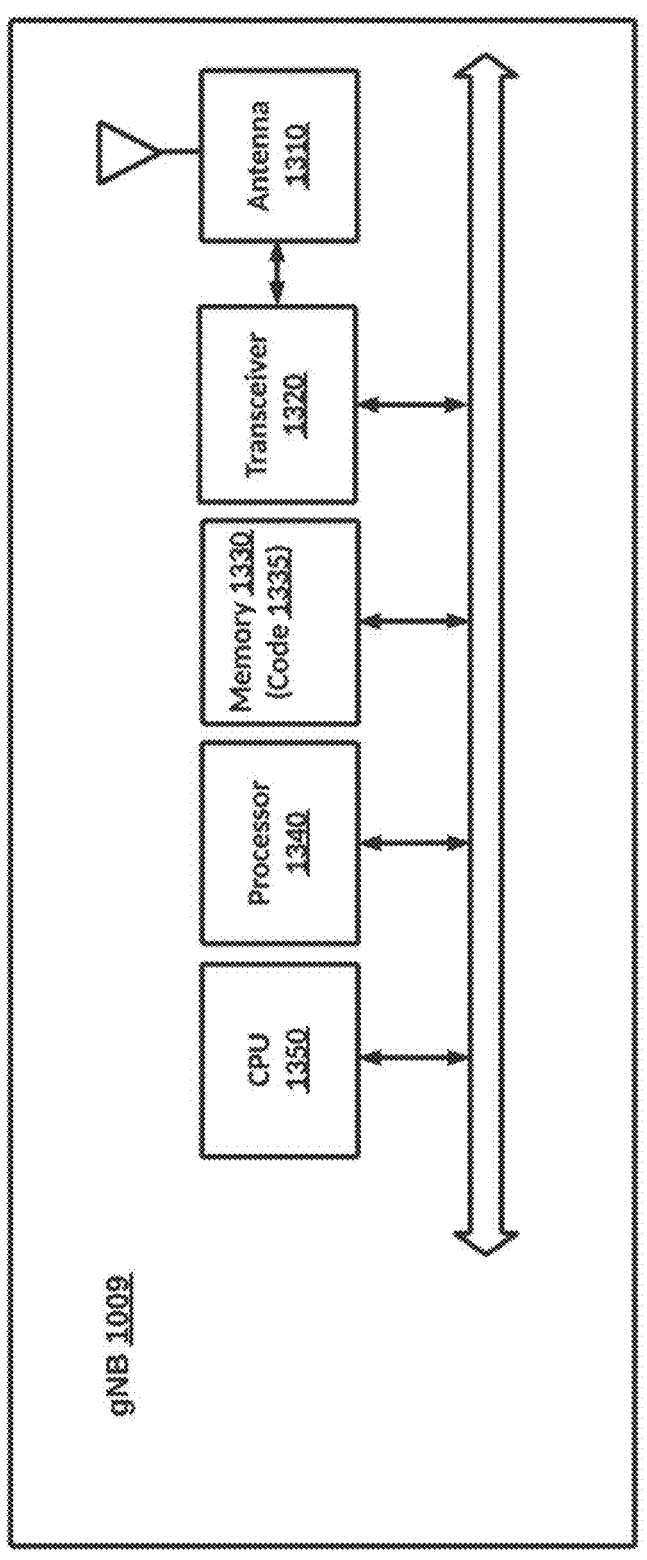
FIG. 13 shows example components of a base station for transmission and/or reception according to some aspects of some of various exemplary embodiments of the present disclosure.

FIG. 13 shows example components of a gNB 1009 for transmission and/or reception according to some aspects of some of various exemplary embodiments of the present disclosure. All or a subset of blocks and functions in FIG. 13 may be in the gNB 1009 or may be performed by the gNB 1009. The antenna 1310 may be used for transmission or reception of electromagnetic signals. The antenna 1310 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 1310 may enable a massive MIMO configuration with tens or hundreds of antenna elements. The antenna 1310 may enable other multi-antenna techniques such as beamforming. In some examples and depending on the gNB 1009 capabilities, the gNB 1009 may support a single antenna only.

The transceiver 1320 may communicate bi-directionally, via the antenna 1310, wireless links as described herein. For example, the transceiver 1320 may represent a wireless transceiver at the UE and may communicate bi-directionally with the wireless transceiver at the base station or vice versa. The transceiver 1320 may include a modem to modulate the packets and provide the modulated packets to the antennas 1310 for transmission, and to demodulate packets received from the Antennas 1310.

The memory 1330 may include RAM and ROM. The memory 1330 may store computer-readable, computer-executable code 1335 including instructions that, when executed, cause the processor to perform various functions described herein. In some examples, the memory 1330 may contain, among other things, a Basic Input/output System (BIOS) which may control basic hardware or software operation such as the interaction with peripheral components or devices.

The processor 1340 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory using a memory controller. In other examples, a memory controller may be integrated into the processor 1340. The processor 1340 may be configured to execute computer-readable instructions stored in a memory (e.g., the memory 1330) to cause the gNB 1009 to perform various functions.

The Central Processing Unit (CPU) 1350 may perform basic arithmetic, logic, controlling, and Input/output (I/O) operations specified by the computer instructions in the Memory 1330.

Figures 14A, 14B:
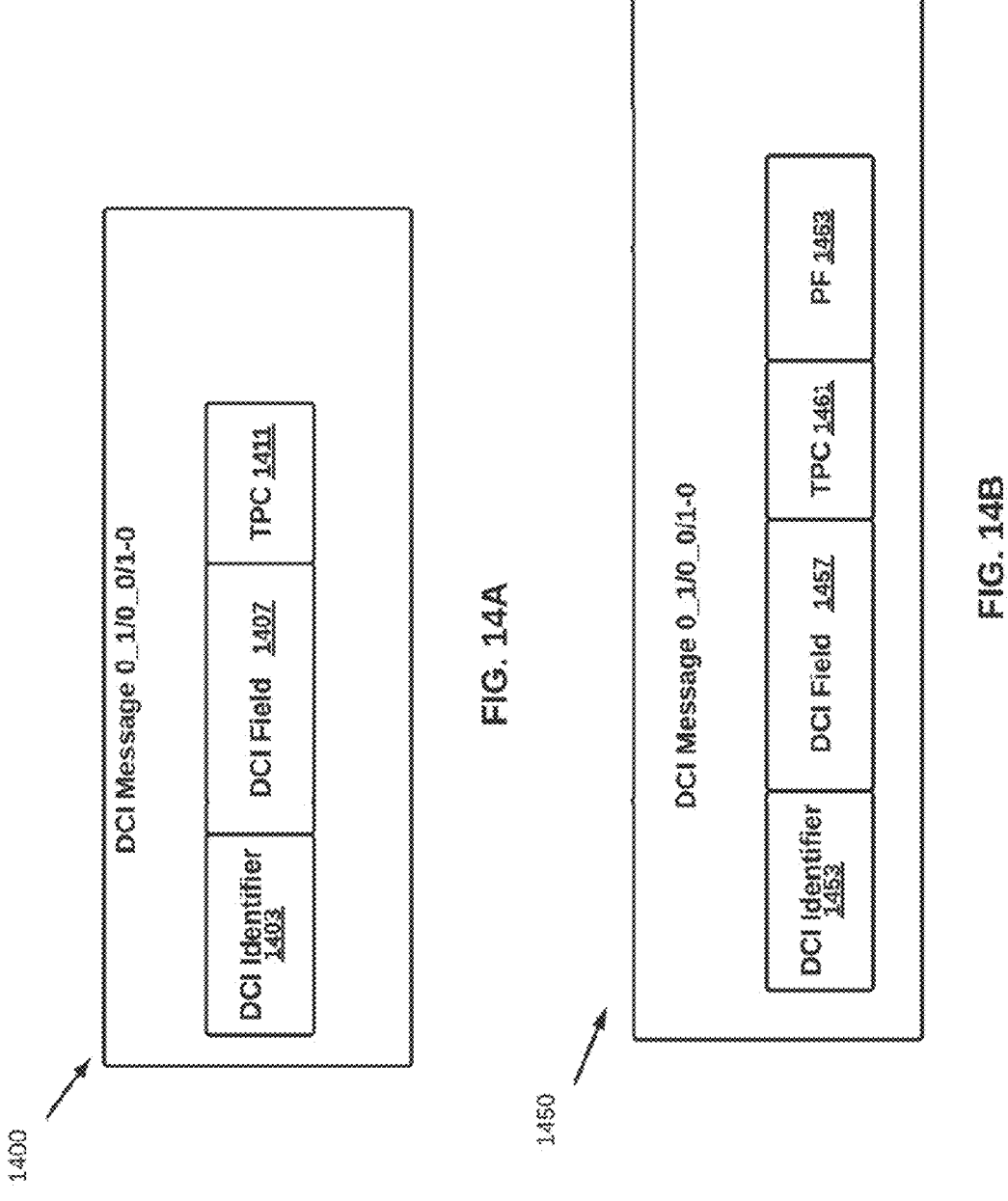
FIG. 14 shows example of a first embodiment of a Downlink Control Information (DCI) message according to some aspects of some of various exemplary embodiments of the present disclosure.

FIG. 14A shows an exemplary downlink control information (DCI) message structure 1400 according to according to some aspects of some of various exemplary embodiments of the present disclosure. The DCI message 1400 (e.g., DCI message format 0_1, 0_0, 1_0) may be used by the gNB to transmit the beamforming and TPC commands to a UE in a cell. As shown, the DCI message 1400 may include:

(i) a DCI identifier 1403 which indicates the DCI format 0_1/0_0/1_0

(ii) DCI field 1407 includes information for scheduling PUSCH in one cell (iii) Transmit Power Control (TPC)/Phase Feedback (PF) field 1411 of length two bits, used to indicate the UE to increase or decrease it transmit power.

The DCI format 0_0/0_1 may be used to schedule PUSCH, and the DCI format 1_0 may be used to schedule PDSCH in one cell. The DCI message 1400 may be configured for group-common PDCCH or UE specific PDCCH. In some examples, if the UE does not receive DCI format 1400 via the group-common PDCCH, the UE may receive the DCI format 1400 via a UE-specific PDCCH in a slot. The gNB may inform the UE through RRC signaling whether to decode group-common PDCCH or UE-specific PDCCH. In some instances that group-common PDCCH is transmitted, the UE may decide to decode common-group PDCCH or not. Moreover, when the UE is monitoring for common-group PDCCH, it may process a detected UE-specific PDCCH irrespective of whether the group-common PDCCH is received or not.

In some examples, once the UE decodes the DCI message 1400, it may map the TPC command to a tpc value from a lookup table (e.g., Table 1), and may perform a beamforming control loop to compute or track the beamforming phase (e.g., equation (1)), and may perform a TPC loop to select or update transmit power (e.g., equation (2)). The beamforming control loop and TPC loop order can be interchangeable. In some implementations, the equations (1) and (2) can be precomputed, and stored in lookup tables in the memory. Precomputing the values of equation (1) and (2) and storing in the memory can reduce the processing delay significantly. For example, the UE may precompute the beamforming phase for different propagation environments such as channel delay profile, Doppler spread, distance from gNB, modulation and coding scheme (MCS), etc., stores the beamforming phases in lookup tables, and accordingly selects the corresponding phase to transmit signals in each related scenario.

FIG. 14B shows an exemplary downlink control information (DCI) message structure 1450 according to according to some aspects of some of various exemplary embodiments of the present disclosure. The DCI message 1450 (e.g., DCI message format 0_1, 0_0, 1_0) may be used by the gNB to transmit the beamforming and TPC commands to a UE in a cell. As shown, the DCI message 1450 may include:

(i) a DCI identifier 1403 which indicates the DCI format 0_1/0_0/1_0

(ii) DCI field 1407 includes information for scheduling PUSCH in one cell (iii) Transmit Power Control (TPC) field 1461 includes two bits, used to indicate the UE to increase or decrease it transmit power.

(iv) Phase Feedback (PF) field 1463 includes two bits, used to indicate the UE beamforming phase update commands.

The DCI format 0_0/0_1 may be used to schedule PUSCH, and the DCI format 1_0 may be used to schedule PDSCH in one cell. The DCI message 1450 may be configured for group-common PDCCH or UE specific PCCH. In some examples, if the UE does not receive DCI format 1450 via the group-common PDCCH, the UE may receive the DCI format 1450 via a UE-specific PDCCH in a slot. The gNB may inform the UE through RRC signaling whether to decode group-common PDCCH or UE-specific PDCCH. In some instances that group-common PDCCH is transmitted, the UE may decide to decode common-group PDCCH or not. Moreover, when the UE is monitoring for common-group PDCCH, it may process a detected UE-specific PDCCH irrespective of whether the group-common PDCCH is received or not.

In some examples, once the UE decodes the DCI message 1450, it may map the PF command to an F(n) value from a lookup table (e.g., Table 2), and may perform a beamforming control loop to compute or track the beamforming phase (e.g., equation (3)), and may perform a TPC loop to select or update transmit power (e.g., equation (2)). The beamforming control loop and TPC loop orders can be interchangeable. In some implementations, the equations (3) and (2) can be precomputed, and stored in lookup tables in the memory. Precomputing the values of equation (3) and (2) and storing in the memory can reduce the processing delay significantly. For example, the UE may precompute the beamforming phase for different propagation environments such as channel delay profile, Doppler spread, distance from gNB, modulation and coding scheme (MCS), etc., stores the beamforming phases in lookup tables, and accordingly selects the corresponding phase to transmit signals in each related scenario.

Figures 15A, 15B:
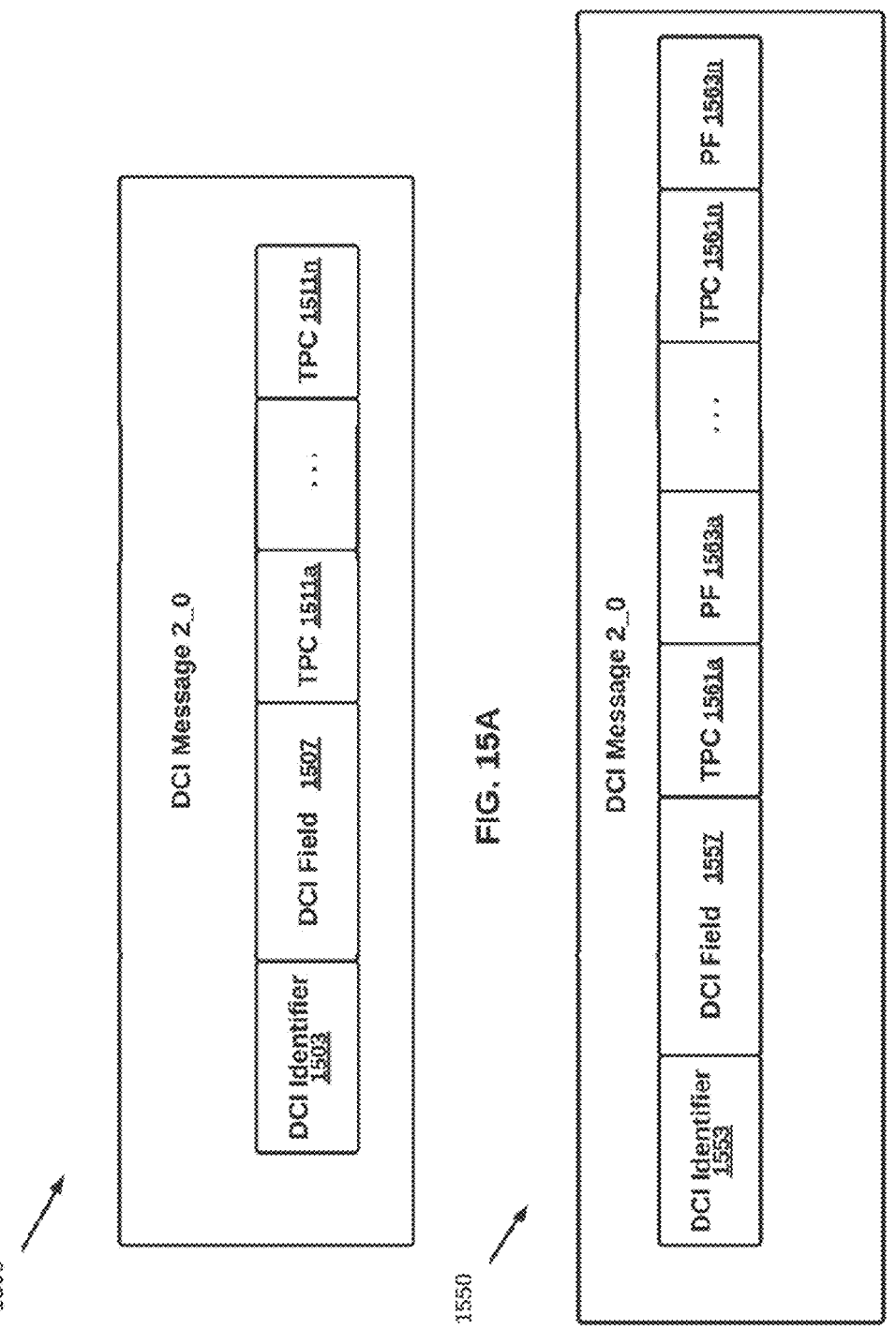
FIG. 15 shows example of a second embodiment of a Downlink Control Information (DCI) message according to some aspects of some of various exemplary embodiments of the present disclosure.

FIG. 15A shows an exemplary downlink control information (DCI) message structure 1500 according to according to some aspects of some of various exemplary embodiments of the present disclosure. The DCI message 1500 (e.g., DCI message format 2_0) may be used by the gNB to transmit the beamforming and TPC commands to a group of UEs in a cell. As shown, the DCI message 1500 may include:

(i) a DCI identifier 1503 which indicates the DCI format 2_0

(ii) DCI field 1507 includes information for notifying and scheduling group of UEs in a cell.

(iii) Transmit Power Control (TPC)/Phase Feedback (PF) fields 1511a-1511n of length two bits, may be used to indicate the UEs in the group to increase or decrease it transmit power.

The DCI field 1507 may be used to notify a group of UEs the slot format, available RB sets, Channel Occupancy Time (COT) duration and search space group switching. The DCI format 2_0 is scrambled by the identifier SFI-RNTI, and its size may be configured by RRC signaling. The TPC/PF fields 1511a-1511n indicate the TPC/PF commands for computing and tracking beamforming vector and transmit power for the UEs in the group.

In some examples, once the UE decodes the DCI message 1500, it may map the n TPC commands to n tpc values from a lookup table (e.g., Table 1), and for each UE in the group may perform a beamforming control loop to compute or track the beamforming phase (e.g., equation (1)), and may perform a TPC loop to select or update transmit power (e.g., equation (2)). The beamforming control loop and TPC loop order can be interchangeable. In some implementations, the equations (1) and (2) can be precomputed, and stored in lookup tables in the memory. Precomputing the values of equation (1) and (2) and storing in the memory can reduce the processing delay significantly. For example, the UEs may precompute the beamforming phase for different propagation environments such as channel delay profile, Doppler spread, distance from gNB, modulation and coding scheme (MCS), etc., stores the beamforming phases in lookup tables, and accordingly select the corresponding phases to transmit signals in each related scenario.

FIG. 15B shows an exemplary downlink control information (DCI) message structure 1550 according to according to some aspects of some of various exemplary embodiments of the present disclosure. The DCI message 1550 (e.g., DCI message format 2_0) may be used by the gNB to transmit the beamforming and TPC commands to a group of UEs. As shown, the DCI message 1550 may include:

(i) a DCI identifier 1553 which indicates the DCI format 2_0

(ii) DCI field 1557 includes information for notifying and scheduling group of UEs in a cell.

(iii) TPC fields 1561a-1561n, each field includes two bits, used to indicate the UE to increase or decrease it transmit power.

(iv) PF fields 1563a-1563n, each field includes two bits, used to indicate the UE beamforming phase update commands.

The DCI field 1557 may be used to notify a group of UEs the slot format, available RB sets, Channel Occupancy Time (COT) duration and search space group switching. The DCI format 2_0 is scrambled by the identifier SFI-RNTI, and its size may be configured by RRC signaling. The TPC fields 1561a-1561n may indicate the TPC commands for transmit power control, and the PF fields 1563a-1563n may indicate the PF commands for beamforming vector computation and tracking for the UEs in the group.

In some examples, once the UE decodes the DCI message 1550, it may map the n TPC and n PF commands to n tpc values from a lookup table (e.g., Table 1)., and for each UE in the group may perform a beamforming control loop to compute or track the beamforming phase (e.g., equation (1)), and may perform a TPC loop to select or update transmit power (e.g., equation (2)). The beamforming control loop and TPC loop order can be interchangeable. In some implementations, the equations (1) and (2) can be precomputed, and stored in lookup tables in the memory. Precomputing the values of equation (1) and (2) and storing in the memory can reduce the processing delay significantly. For example, the UEs may precompute the beamforming phase for different propagation environments such as channel delay profile, Doppler spread, distance from gNB, modulation and coding scheme (MCS), etc., stores the beamforming phases in lookup tables, and accordingly select the corresponding phases to transmit signals in each related scenario.

Figures 16A, 16B:
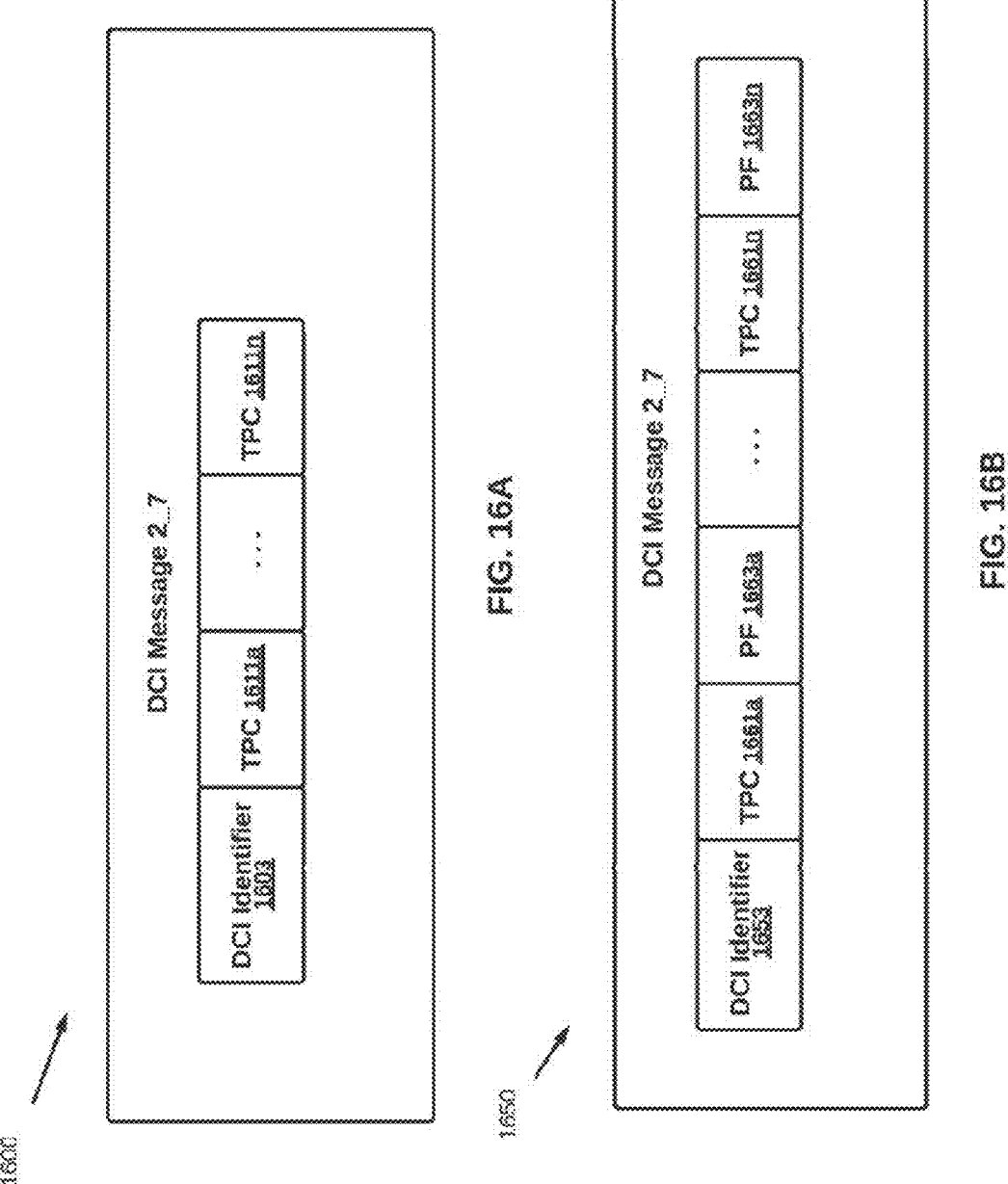
FIG. 16 shows example of a third embodiment of a Downlink Control Information (DCI) message according to some aspects of some of various exemplary embodiments of the present disclosure.

FIG. 16A shows an exemplary downlink control information (DCI) message structure 1600 according to according to some aspects of some of various exemplary embodiments of the present disclosure. The DCI message 1600 (e.g., DCI message format 2_7) may be used by the gNB to transmit the beamforming and TPC commands to a group of UEs in a cell. As shown, the DCI message 1600 may include:

(i) a DCI identifier 1603 which indicates the DCI format 2_7

(ii) Transmit Power Control (TPC)/Phase Feedback (PF) field 1611a-1611n of length two bits, may be used to indicate the UEs in the group to increase or decrease it transmit power.

The DCI format 2_7 is reserved and may be configured for a group of UEs to transmit TPC and PF commands. The DCI format 2_7 size may be configured by RRC signaling. The TPC/PF fields 1611a-1611n indicate the TPC/PF commands for computing and tracking beamforming vector and transmit power for the UEs in the group.

In some examples, once the UE decodes the DCI message 1600, it may map the n TPC commands to n tpc values from a lookup table (e.g., Table 1)., and for each UE in the group may perform a beamforming control loop to compute or track the beamforming phase (e.g., equation (1)), and may perform a TPC loop to select or update transmit power (e.g., equation (2)). The beamforming control loop and TPC loop order can be interchangeable. In some implementations, the equations (1) and (2) can be precomputed, and stored in lookup tables in the memory. Precomputing the values of equation (1) and (2) and storing in the memory can reduce the processing delay significantly. For example, the UEs may precompute the beamforming phase for different propagation environments such as channel delay profile, Doppler spread, distance from gNB, modulation and coding scheme (MCS), etc., stores the beamforming phases in lookup tables, and accordingly select the corresponding phases to transmit signals in each related scenario.

FIG. 15B shows an exemplary downlink control information (DCI) message structure 1650 according to according to some aspects of some of various exemplary embodiments of the present disclosure. The DCI message 1650 (e.g., DCI message format 2_7) may be used by the gNB to transmit the PF and TPC commands to a group of UEs. As shown, the DCI message 1650 may include:

(i) a DCI identifier 1653 which indicates the DCI format 2_7.

(ii) TPC fields 1661a-1661n, each field includes two bits, used to indicate the UE to increase or decrease it transmit power.

(iii) PF fields 1663a-1663n, each field includes two bits, used to indicate the UE beamforming phase update commands.

The TPC fields 1611a-1611n indicate the transmit power control, and PF fields 1663a-1663n, indicate commands for computing and tracking beamforming vector for the UEs in the group.

In some examples, once the UE decodes the DCI message 1650, it may map the n TPC and n PF commands to n tpc values from a lookup table (e.g., Table 1)., and for each UE in the group may perform a beamforming control loop to compute or track the beamforming phase (e.g., equation (1)), and may perform a TPC loop to select or update transmit power (e.g., equation (2)). The beamforming control loop and TPC loop order can be interchangeable. In some implementations, the equations (1) and (2) can be precomputed, and stored in lookup tables in the memory. Precomputing the values of equation (1) and (2) and storing in the memory can reduce the processing delay significantly. For example, the UEs may precompute the beamforming phase for different propagation environments such as channel delay profile, Doppler spread, distance from gNB, modulation and coding scheme (MCS), etc., stores the beamforming phases in lookup tables, and accordingly select the corresponding phases to transmit signals in each related scenario.

Figure 17:
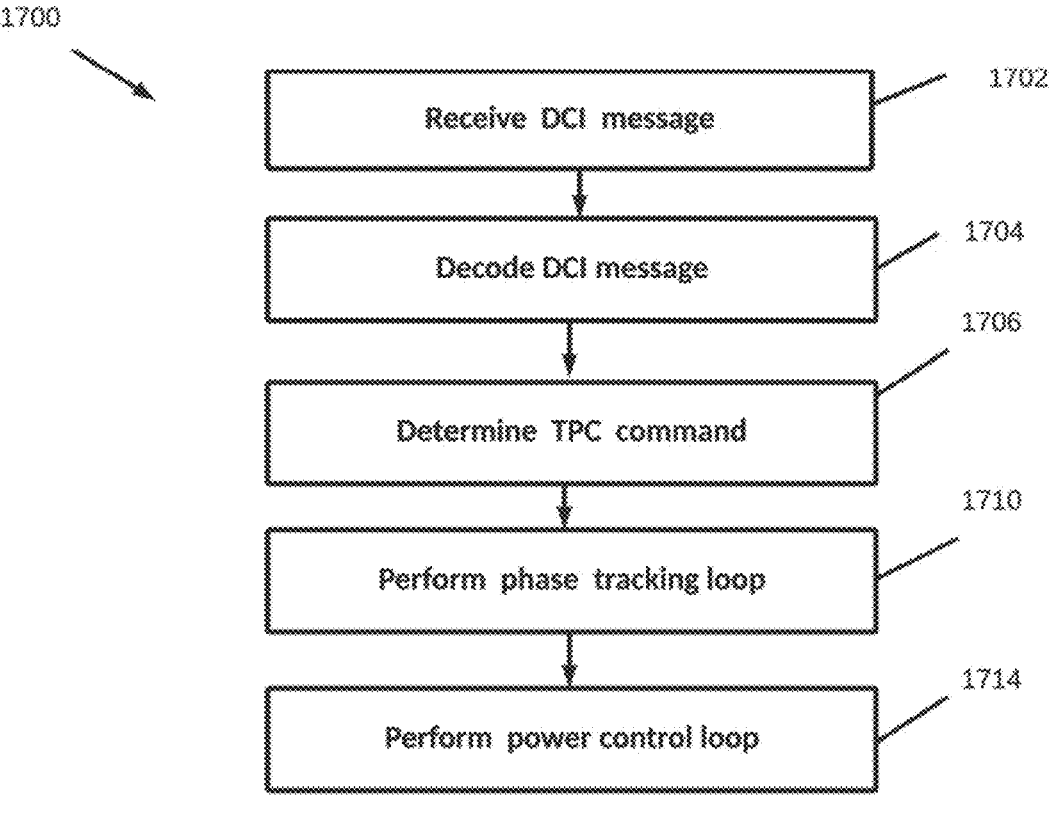
FIG. 17 shows a flow diagram of a beamforming and power control loop method according to some aspects of some of various exemplary embodiments of the present disclosure.

FIG. 17 is a flow diagram of a UL beamforming and power control method according to some aspects of some of various exemplary embodiments of the present disclosure. The method 1700 is described with reference to the gNBs 1009, and UE 1005 described in FIGS. 10-13.

At step 1702, UE receives a DCI message from gNB indicating TPC commands. For instance, the DCI message can be a DCI message format 0_0, 0_1, 1_0, 2_0, and 2_7 with reference to FIGS. 13-16. The DCI message may include other information including the scheduling information for the UE as well.

At step 1704, the UE decode the DCI message, recover the transmitted bits, and identify the DCI fields.

At step 1706, the UE determines the TPC commands from the DCI message. Once the UE determines the TPC commands, it maps the TPC commands to a tpc value as described previously (e.g., Table 1-2).

At step 1710 the UE uses tpc to perform a phase tracking loop. For instance, the UE may use equation 1 or 3 to compute, and track the beamforming vector.

At step 1714, the UE uses tpc to perform a power control loop. For instance, the UE may use equation 2 to select, and adjust the transmit power.

Figure 18A:
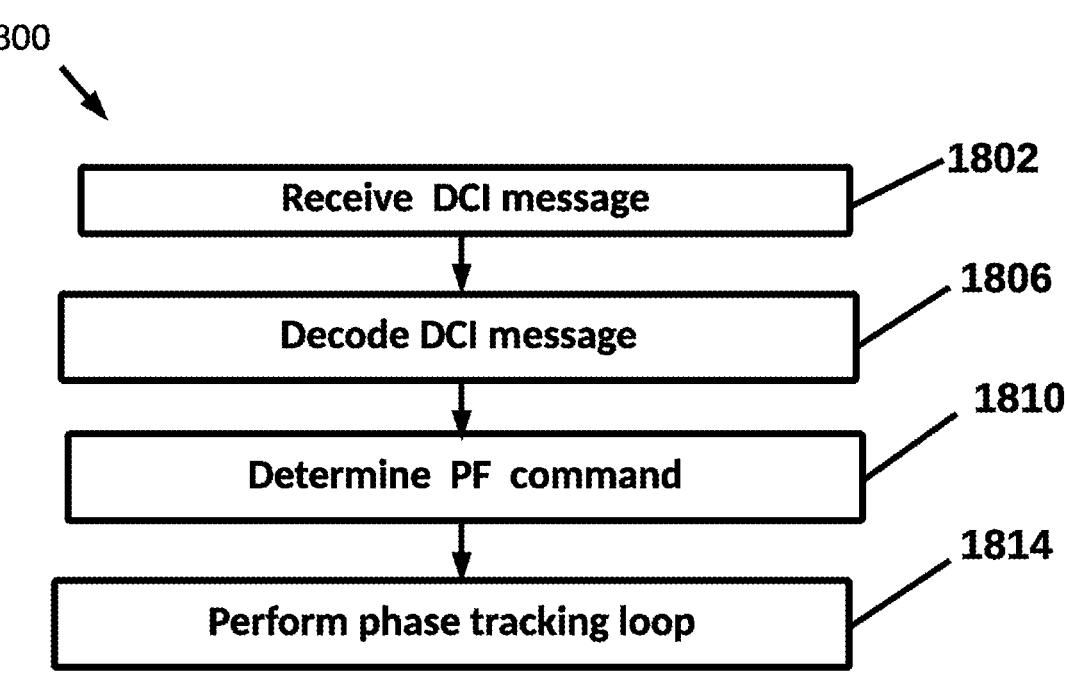
FIG. 18A and 18B show a flow diagram of another beamforming and power control loop method according to some aspects of some of various exemplary embodiments of the present disclosure.
Figure 18B:
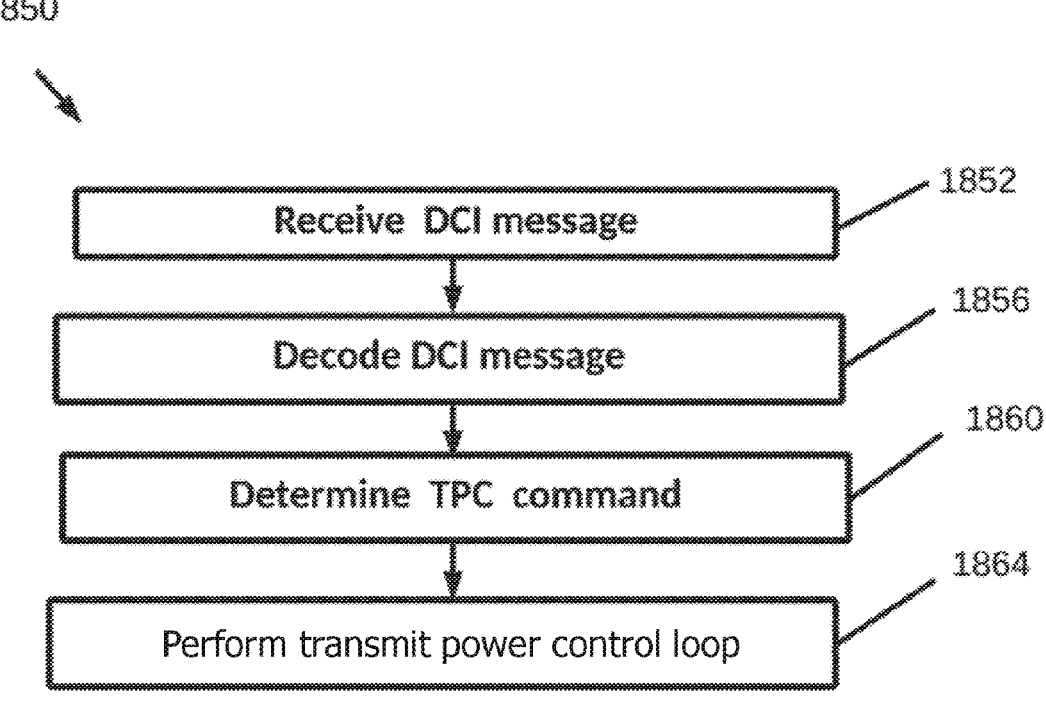

FIG. 18A and 18B show flow diagrams of UL beamforming method 1800 and power control method 1850 respectively according to some aspects of some of various exemplary embodiments of the present disclosure. It is appreciated that methods 1800 may be performed independent of method 1850. The methods 1800 and 1850 are described with reference to the gNBs 1009, and UE 1005 described in FIGS. 10-13.

At step 1802, UE receives a DCI message from gNB indicating PF commands. For instance, the DCI message can be a DCI message format 0_0, 0_1, 1_0, 2_0, and 2_7 with reference to FIGS. 13-16. The DCI message may include other information including the scheduling information for the UE as well.

At step 1806, the UE decode the DCI message, recover the transmitted bits, and identify the DCI fields.

At step 1810, the UE determines the PF commands from the DCI message. Once the UE determines the PF commands, it maps the PF commands to a tpc value as described previously (e.g., Table 1-2).

Finally, per step 1814 the UE uses tpc to perform a phase tracking loop. For instance, the UE may use equation 1 or 3 to compute, and track the beamforming vector.

At step 1852, UE receives a DCI message from gNB indicating TPC commands. For instance, the DCI message can be a DCI message format 0_0, 0_1, 1_0, 2_0, and 2_7 with reference to FIGS. 13-16. The DCI message may include other information including the scheduling information for the UE as well.

At step 1856, the UE decode the DCI message, recover the transmitted bits, and identify the DCI fields.

At step 1860, the UE determines the TPC commands from the DCI message. Once the UE determines the TPC commands, it maps the TPC commands to a tpc value as described previously (e.g., Table 1-2).

Finally, per step 1864 the UE uses tpc to perform a transmit power control loop. For instance, the UE may use equation 2 to select, and adjust the transmit power.

Figure 19:
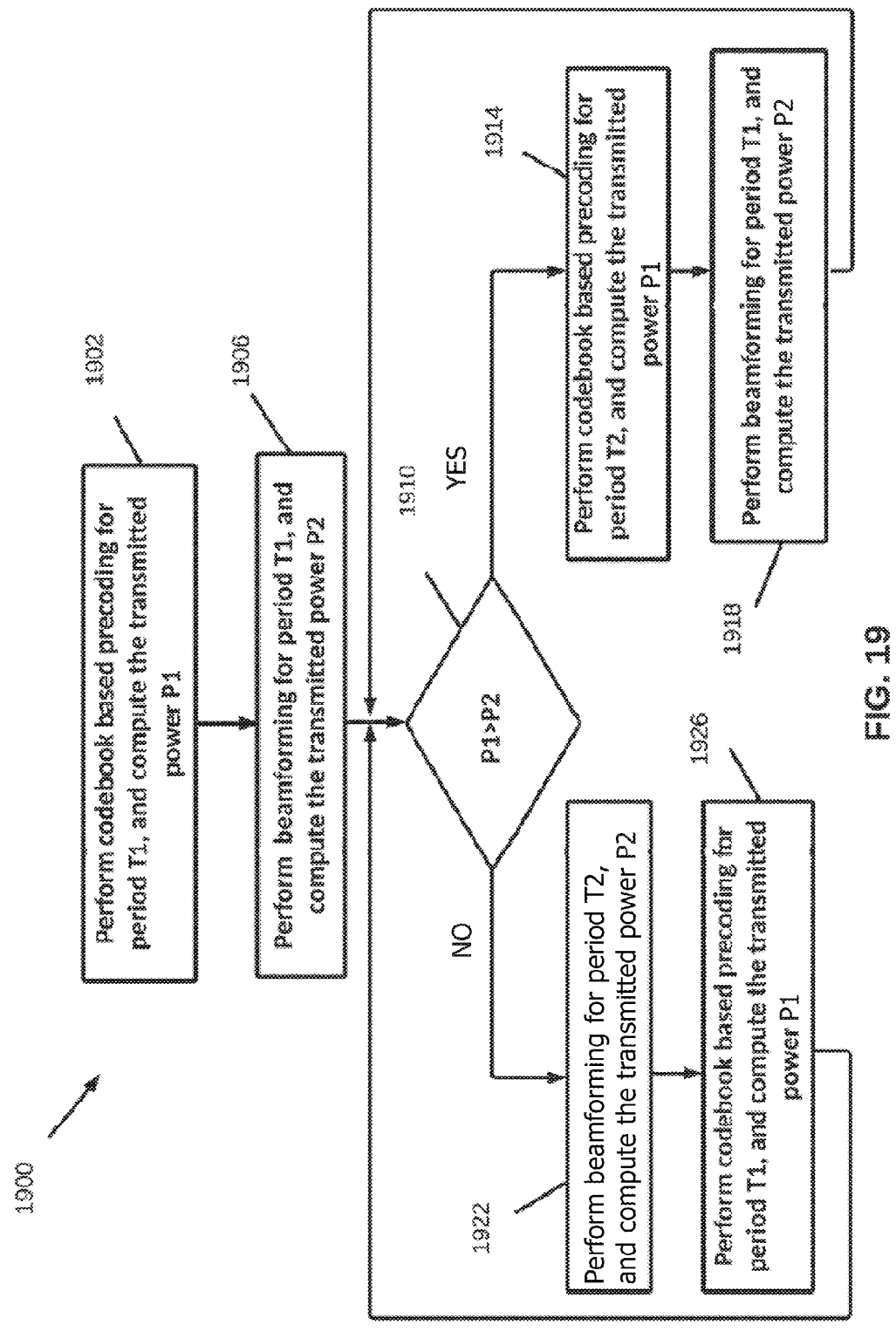
FIG. 19 shows flow diagram of a method for selecting beamforming or codebook based precoding schemes according to some aspects of some of various exemplary embodiments of the present disclosure.

FIG. 19 is a flow diagram of a method for selecting beamforming or codebook based precoding schemes for UL transmission according to some aspects of some of various exemplary embodiments of the present disclosure. The method 1900 is described with reference to the gNBs 1009, and UE 1005 described in FIGS. 10-13.

At step 1902, UE uses codebook bases precoding for a period T1, and compute the transmitted power per symbol P1. In codebook based precoding scheme, the UE selects a precoder from a set of predefined precoders for UL transmission of data and control signaling. For instance, 3GPP TS 38.211 V16.3.0 (2020-09)-3rd Generation Partnership Project; Technical Specification Group Radio Access Network; NR; Physical channels and modulation (Release 16)," incorporated herein by reference in its entirety, describes a codebook base precoding technique for UL transmission in 5G-NR systems.

At step 1906, the UE uses UL beamforming for period T1, and computes the transmit power per symbol P2.

At step 1910, the UE determines whether using UL beamforming or codebook base precoding can provide higher power gain. If codebook base precoding can provide higher power gain, the UE proceeds to step 1914. If the UL beamforming can provide higher gain the UE proceeds to step 1922.

At step 1914 the UE uses codebook based precoding scheme, for period T2, for UL transmission of data and/or control signaling, and computes the transmit power per symbol P1.

At step 1918, the UE switches to UL beamforming for a short period T1 (e.g., T1≤T2), and compute the transmit power per symbol P2. Then, the UE proceeds to step 1910 to determine whether to use beamforming or codebook based transmission.

At step 1922, the UE uses UL beamforming, for period T2, for UL transmission of data or control signaling, and compute the transit power per symbol P2.

At step 1926, the UE switches to codebook based precoding for a period short T1 (e.g., T1≤T2), and computes the transmit power per symbol P1. Then, the UE proceeds to step 1910 to determine whether to use beamforming or codebook based transmission.

Figure 20:
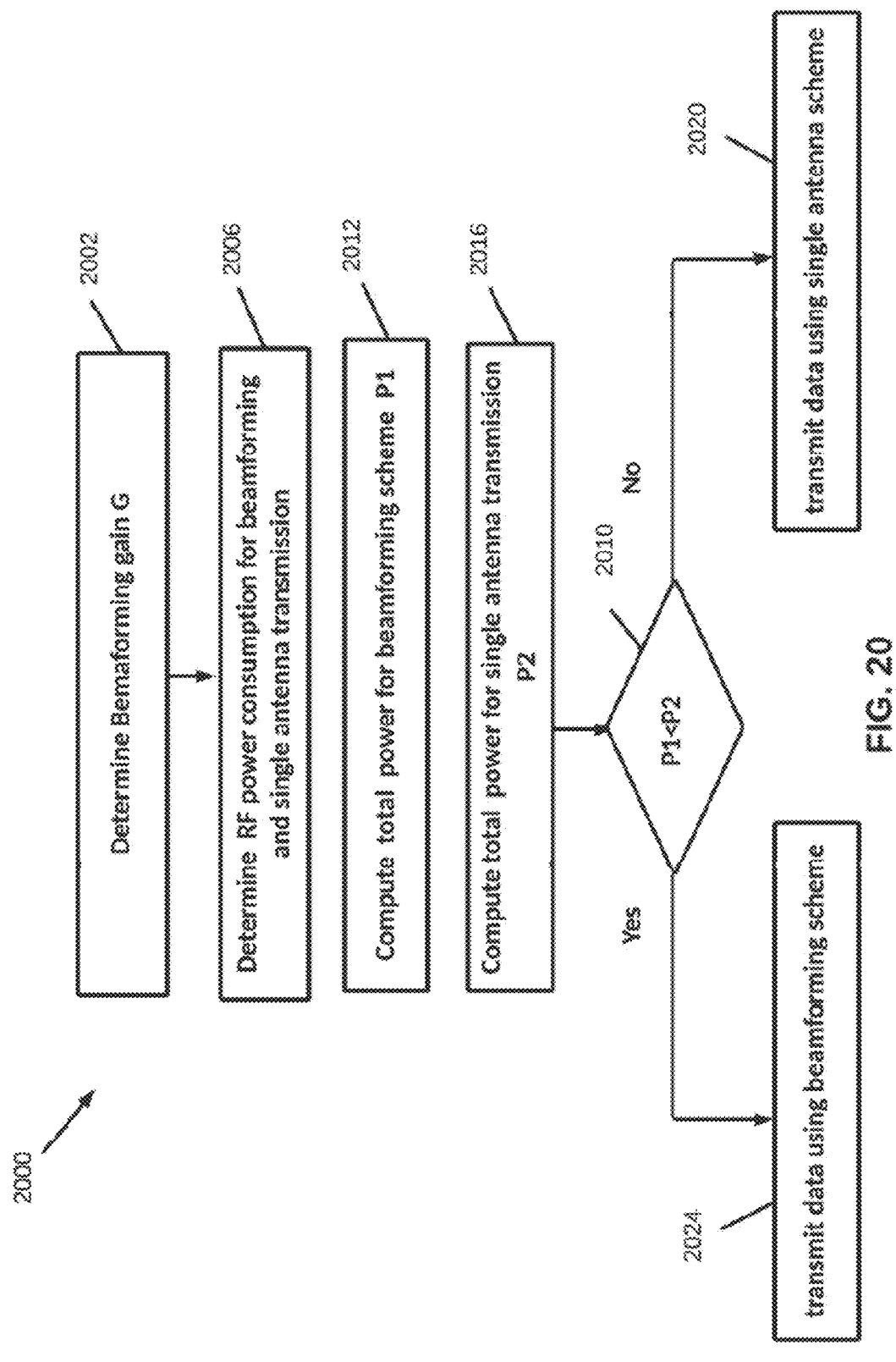
FIG. 20 shows flow diagram of a method for selecting beamforming or single antenna transmission schemes according to some aspects of some of various exemplary embodiments of the present disclosure.

FIG. 20 is a flow diagram of a method for selecting beamforming or single antenna scheme for UL transmission according to some aspects of some of various exemplary embodiments of the present disclosure. The method 2000 is described with reference to the gNBs 1009, and UE 1005 described in FIGS. 10-13.

At step 2002, UE determines the beamforming gain G. The beamforming gains for different propagation environments may be precomputed, and stored in the UE memory. From the beamforming gain G, the UE can compute the transmission power required for beamforming $P_B$ and single antenna scheme $P_S$ to achieve a target SNR required at the gNB for error free decoding of transmitted signals (e.g., $P_B = P_S/G$).

At step 2006, the UE computes the RF power consumption for beamforming and single antenna transmission. For instance, the transmit power consumption of architecture of FIG. 11, includes circuit power consumption of each RF chain denoted as $P_{RF}$ and the power amplifier power $P_{PA}$. $P_{RF}$ is a constant power irrespective of transmit power P, while $P_{PA}$ depends on the transmit power. $P_{PA}$ can be modeled as $P_{PA} = P/\eta$, where n is the power amplifier efficiency. As a result, the total power consumption for a UE with m+1 antennas employing the beamforming scheme can be calculated as:

$$P_1 = \frac{P_B}{(m+1)\eta} + (m+1)P_{RF} \qquad (4)$$

The $P_{RF}$, and $\eta$ can be stored in the UE memory and accessed when need to compute the $P_{TOT}$.

At step 2012, the UE computes the total power consumption P1 for UL beamforming scheme with m+1 antennas. For instance, the UE may use equation (4) to compute the P1.

At step 2016, the UE computes the total power consumption P2 for single antenna transmission scheme. For instance, the UE may use equation (5) to compute the P2.

$$P2 = \frac{P_s}{\eta} + P_{RF} \qquad (5)$$

At step 2010, the UE determines to use beamforming or single antenna transmission based on the difference between total power consumption AP=P2-P1. If Δ>0, the UE proceeds to step 2024, and if ΔP<0 the UE proceeds to step 2020.

At step 2020, the UE uses single antenna scheme for transmission of data and control signal to the gNB.

At step 2024, the UE uses UL beamforming scheme for transmission of data and control signal to the gNB.

Figure 21:
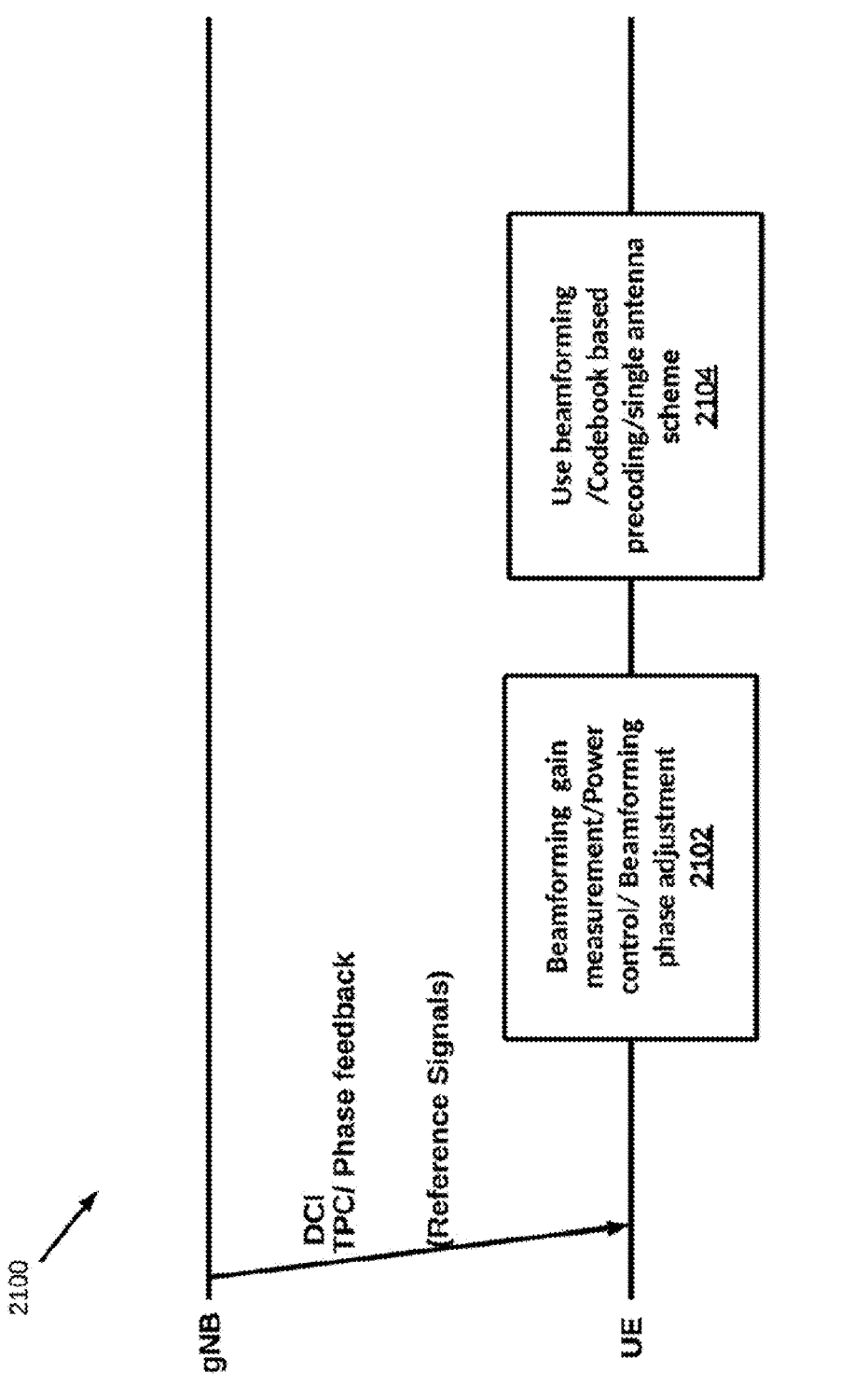
FIG. 21 is a sequence diagram illustrating UL beamforming method according to some aspects of some of various exemplary embodiments of the present disclosure.

FIG. 21 is a sequence diagram illustrating UL beamforming method according to some aspects of some of various exemplary embodiments of the present disclosure as described previously in FIGS. 17-20.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Cause 1. A method of data transmission, comprising the steps of:

receiving, by a user equipment (UE) from a base station (BS), a configuration message including one or more signal quality indicators associated with configuration parameters of a first uplink beam; and determining, by the UE, configuration parameters associated with a second uplink beam based on:

the one or more signal quality indicators associated with configuration parameters of the first uplink beam; and the configuration parameters of the first uplink beam;

configuring, by the UE, the second uplink beam based on the determined configuration parameters for the second uplink beam; and transmitting, by the UE to the BS, uplink data or control information using the second uplink beam.

Cause 2. The method of cause 1, wherein the configuration parameters comprise one or more of:

a transmit power control (TPC) signal; and a phase feedback (PF) signal.

Cause 3. The method of cause 1, wherein the step of determining includes mapping the configuration parameters to integer values based on one or more look up tables.

Cause 4. The method of cause 1, wherein the step of determining identifies the configuration parameters that maximize the second uplink beam signal-to-noise ratio (SNR) at the gNB.

Cause 5. The method of cause 4, further comprising performing an adaptive tracking scheme to track the configuration parameters of the second uplink beam.

Cause 6. The method of cause 5, wherein the adaptive tracking scheme is based on a gradient descent algorithm.

Cause 7. The method of cause 1 wherein the configuration message further includes:

an identifier to identify configuration message;

at least one transmit power control (TPC) field; and at most N phase feedback (PF) fields, wherein N is a number of user equipments (UEs) in a group in a cell specified by the base station (BS).

Cause 8. The method of cause 1, wherein the configuration message is received via a downlink control information (DCI).

Cause 9. A method of determining a data transmission scheme, comprising the steps of:

first transmitting, by a user equipment (UE) to a base station (BS) data or control information using a first transmission scheme in a first time period;

first computing, by the UE, a first transmit power for transmission of the data or control information to the BS for the first transmission scheme;

second transmitting, by a user equipment UE to a base station (BS) data or control information using a second transmission scheme in a second time period;

second computing, by the UE, a second transmit power for the transmission of the data or control information to the BS for the second transmission scheme; and determining, by the UE, transmission of the data or control information to the BS by the first or second transmission scheme, based on the computed first transmit power and the computed second transmit power.

Cause 10. A method of data transmission, comprising the steps of:

determining by the base station (BS), configuration parameters of an uplink beam; and transmitting, by the BS, to a user equipment (UE), a configuration message including one or more signal quality indicators associated with the configuration parameters of the uplink beam.

Cause 11. The method of cause 10, wherein the configuration parameters comprise one or more of:

a signal-to-noise ratio (SNR); and a phase information of the uplink beam.

Cause 12. The method of cause 10, further comprising first computing the signal quality indicators based on the configuration parameters.

Cause 13. The method of cause 10, wherein the signal quality indicators comprise one or more of:

a transmit power control (TPC) command; and a phase feedback (PF) command.

Cause 14. The method of cause 10, wherein the configuration message includes:

an identifier to identify the configuration message;

at least one TPC field; and at most N phase feedback (PF) fields, wherein N is number of user equipments (UEs) in a group in a cell specified by the base station (BS).

Cause 15. The method of cause 10, wherein the configuration message is transmitted via a downlink control information (DCI).

Cause 16. A user equipment (UE), comprising:

a transceiver configured to:

receive a configuration message including one or more signal quality indicators associated with configuration parameters of a first uplink beam; and transmit uplink data or control information using a second uplink beam; and a processor in communication with transceiver, the processor configured to:

determine the configuration parameters associated with the second uplink beam based on:

the one or more signal quality indicators associated with the configuration parameters of the first uplink beam; and the configuration parameters of the first uplink beam; and configure the second uplink beam based on the determined configuration parameters for the second uplink beam.

Cause 17. A base station, comprising:

a processor configured to determine configuration parameters of an uplink beam; and a transceiver in communication with the processor and configured to transmit a configuration message indicating one or more signal quality indicators associated with the configuration parameters of an uplink beam.

Cause 18. A non-transitory computer-readable medium having program code recorded, which upon processing by a computer processor, implements the following steps or acts:

a UE receiving a configuration message including one or more signal quality indicators associated with configuration parameters of a first uplink beam; and the UE determining configuration parameters associated with a second uplink beam based on:

the one or more signal quality indicators associated with configuration parameters of the first uplink beam; and the configuration parameters of the first uplink beam;

the UE configuring the second uplink beam based on the determined configuration parameters for the second uplink beam; and the UE transmitting uplink data or control information using the second uplink beam.

Cause 19. A non-transitory computer-readable medium having program code recorded, which upon processing by a computer processor implement the following steps or acts:

a base station (BS) configuring parameters of an uplink beam; and the BS transmitting a configuration message indicating one or more signal quality indicators associated with the configuration parameters of the uplink beam.

Cause 20. A user equipment (UE), comprising:

means for receiving, from a base station (BS), a configuration message indicating one or more signal quality indicators associated with configuration parameters of a first uplink beam; and means for determining, configuration parameters associated with a second uplink beam based on:

the one or more signal quality indicators associated with configuration parameters of the first uplink beam; and the configuration parameters of the first uplink beam;

means for configuring, the second uplink beam based on the determined configuration parameters for the second uplink beam; and means for transmitting, to the BS, uplink data or control information using the second uplink beam.

What is claimed is:

1. A method of data transmission, comprising the steps of:

receiving, by a user equipment (UE) from a base station (BS), a configuration message including one or more signal quality indicators associated with configuration parameters of a first uplink beam;

determining, by the UE, configuration parameters of a second uplink beam based on:

the one or more signal quality indicators associated with the configuration parameters of the first uplink beam; and the configuration parameters of the first uplink beam;

configuring, by the UE, the second uplink beam based on the determined configuration parameters of the second uplink beam; and transmitting, by the UE to the BS, uplink data or control information using the second uplink beam.

2. The method of claim 1, wherein the configuration parameters of the first uplink beam comprise at least one of:

a transmit power control (TPC) signal; or a phase feedback (PF) signal.

3. The method of claim 1, wherein the determining the configuration parameters of the second uplink beam includes mapping the configuration parameters of the first uplink beam to integer values based on one or more look up tables.

4. The method of claim 1, wherein the determining the configuration parameters of the second uplink beam includes identifying one or more configuration parameters that maximize the second uplink beam signal-to-noise ratio (SNR) at the BS.

5. The method of claim 4, further comprising performing an adaptive tracking scheme to track the configuration parameters of the second uplink beam.

6. The method of claim 5, wherein the adaptive tracking scheme is based on a gradient descent algorithm.

7. The method of claim 1 wherein the configuration message further includes:

an identifier to identify the configuration message;

at least one TPC field; and at most N PF fields, wherein N is a number of UEs in a group in a cell specified by the BS.

8. The method of claim 1, wherein the configuration message is received via downlink control information (DCI).

9. A method of data transmission, comprising:

determining, by a base station (BS), configuration parameters of a first uplink beam; and transmitting, by the BS, to a user equipment (UE), a configuration message including one or more signal quality indicators associated with the configuration parameters of the first uplink beam, wherein configuration parameters of a second uplink beam are determined by the UE based on:

the one or more signal quality indicators associated with the configuration parameters of the first uplink beam; and the configuration parameters of the first uplink beam, and wherein the method further comprises:

receiving, from the UE, uplink data or control information transmitted using the second uplink beam.

10. The method of claim 9, wherein the configuration parameters of the first uplink beam comprise at least one of:

a signal-to-noise ratio (SNR); or a phase information of the first uplink beam.

11. The method of claim 9, further comprising computing the signal quality indicators based on the configuration parameters of the first uplink beam.

12. The method of claim 9, wherein the signal quality indicators comprise at least one of:

a transmit power control (TPC) command; or a phase feedback (PF) command.

13. The method of claim 9, wherein the configuration message includes:

an identifier to identify the configuration message;

at least one TPC field; and at most N PF fields, wherein N is number of UEs in a group in a cell specified by the BS.

14. The method of claim 9, wherein the configuration message is transmitted via downlink control information (DCI).

15. A user equipment (UE), comprising:

a transceiver configured to:

receive a configuration message including one or more signal quality indicators associated with configuration parameters of a first uplink beam; and transmit uplink data or control information using a second uplink beam; and a processor in communication with transceiver, the processor being configured to:

determine the configuration parameters of the second uplink beam based on:

the one or more signal quality indicators associated with the configuration parameters of the first uplink beam; and the configuration parameters of the first uplink beam; and configure the second uplink beam based on the determined configuration parameters of the second uplink beam.

* * * * *